US006328265B1

(12) United States Patent
Dizdarevic

(10) Patent No.: US 6,328,265 B1
(45) Date of Patent: Dec. 11, 2001

(54) SLOT FORMING SEGMENTS AND SLOT CHANGING SPOILERS

(76) Inventor: Faruk Dizdarevic, 3300 W. Lincoln Ave #129, Anaheim, CA (US) 92801

( * ) Notice: Subject to any disclaimer, the term of this patent is extended or adjusted under 35 U.S.C. 154(b) by 0 days.

(21) Appl. No.: 09/318,115

(22) Filed: May 25, 1999

(51) Int. Cl.$^7$ .................................................. B64C 3/50
(52) U.S. Cl. ........................ 244/213; 244/210; 244/211; 244/214; 244/215; 244/216; 244/217
(58) Field of Search ................................... 244/198, 210, 244/211, 213, 214, 215, 216, 217

(56) References Cited

U.S. PATENT DOCUMENTS

| | | | |
|---|---|---|---|
| 2,772,058 | * 11/1956 | Grant | 244/216 |
| 3,112,089 | * 11/1963 | Dornier | 244/216 |
| 3,259,340 | * 7/1966 | Whittley et al. | 244/217 |
| 3,677,504 | 7/1972 | Schwarzler . | |
| 3,721,406 | * 3/1973 | Hurlbert | 244/217 |
| 3,897,029 | 7/1975 | Alvarez | 244/213 |
| 3,921,942 | 11/1975 | Bracka | 244/213 |
| 3,941,334 | 3/1976 | Cole | 244/213 |
| 3,987,983 | 10/1976 | Cole | 244/213 |
| 4,015,787 | 4/1977 | Maieli | 244/213 |
| 4,172,575 | 10/1979 | Cole | 244/213 |
| 4,285,482 | 8/1981 | Lewis | 244/213 |
| 4,360,176 | 11/1982 | Brown | 244/213 |
| 4,399,970 | 8/1983 | Evans | 244/213 |
| 4,427,168 | 1/1984 | McKinney | 244/213 |
| 4,447,028 | 5/1984 | Wang | 244/213 |
| 4,471,927 | 9/1984 | Rudolph | 244/213 |
| 4,705,236 | 11/1987 | Rudolph | 244/213 |
| 4,995,575 | * 2/1991 | Stephenson | 244/216 |
| 5,788,190 | * 8/1998 | Siers | 244/216 |

* cited by examiner

Primary Examiner—J. Woodrow Eldred

(57) ABSTRACT

A slot forming segment is inserted between two portions of a wing, which are adjacent along a longitudinal axis of wing, into a cove of a carved trailing edge of a leading portion of the adjacent portions and pivotal relatively to both adjacent portions of the wing between which it is inserted. The slot forming segment has such a shape and a position of its axis of rotation that by deflecting it downwardly relatively to the leading portion, it is formed a slot inside the wing's structure of large inlet cross section and high convergence ratio for the control of the boundary layer over an upper surface of the wing behind the slot forming segment for the need of extra lift production. Simultaneously, it is increased both a camber and an aerodynamic surface area of a following portion of the adjacent portions whereby additionally increasing the extra lift production on the wing. A slot changing spoiler is inserted directly in front of and above the slot forming segment and has such a shape of its undersurface and a position of its axis of rotation that a camber of an upper surface of the wing and the convergence ratio of the slot is changed by the simultaneous rotation of the slot changing spoiler and the slot forming segment in the opposite direction whereby increasing the rate of change of lift on the wing for the efficient maneuver of an aircraft at low speeds of flight.

19 Claims, 23 Drawing Sheets

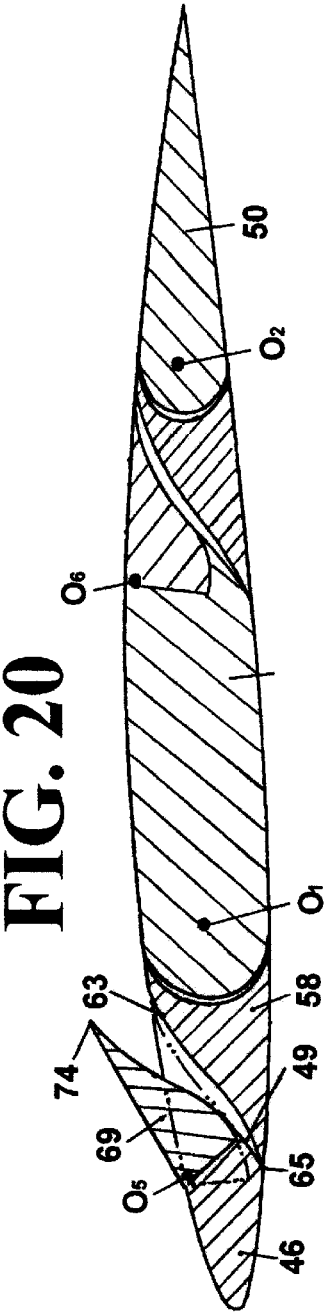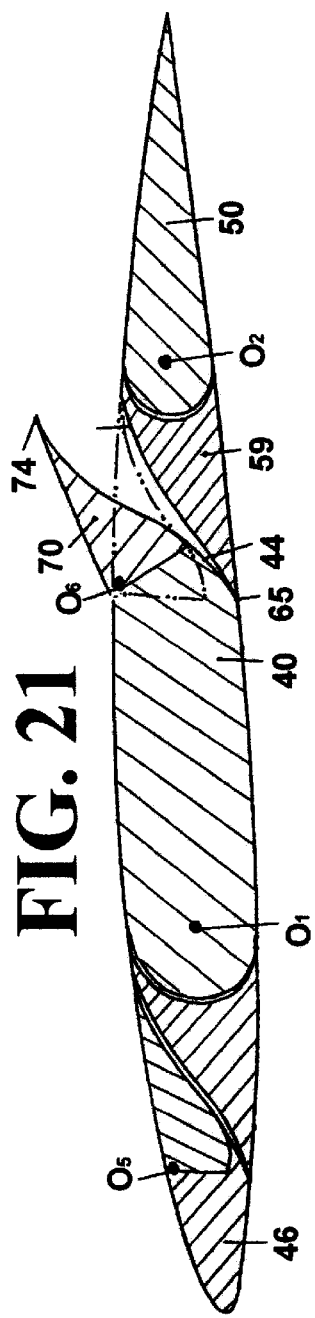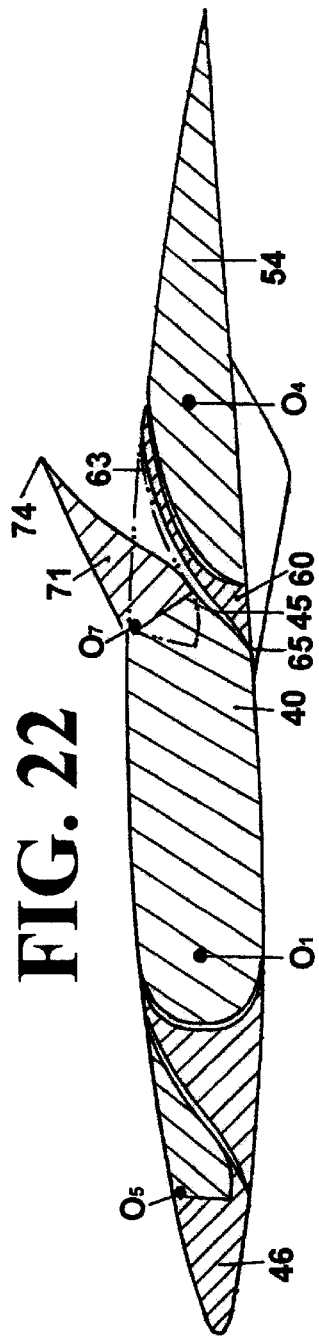

SLOT FORMING SEGMENTS AND SLOT CHANGING SPOILERS

BACKGROUND-TECHNICAL FIELD

This invention relates to the means for extra lift production and regulation thereof on an aircraft wing.

BACKGROUND-DESCRIPTION OF PRIOR ART

For the extra lift production at low speeds, the prior art is using movable slabs that are used on the front portion of wing for the control of boundary layer over an upper camber surface of wing at higher attack angles. For complex slabs trajectories, there has been used various complex and bulky mechanisms disposed in the front portion of wing as it is the case in the following patents:

The U.S. Pat. No. 4,360,176 disclosed a track member mechanism, while the U.S. Pat. No. 4,399,970 disclosed a combination of a track member and a lever mechanism.

The U.S. Pat. No. 3,941,334 and the U.S. Pat. No. 4,427,168 show the deformation and lowering of the entire front portion of wing with the simultaneous extraction of slabs and formation of a slot.

The U.S. Pat. No. 3,897,029 discloses a formation of two successive slots on the front portion of wing using a pair of slabs.

All the solutions that use movable slabs require fairly large space within the front portion of wing for placement of very complex and bulky mechanisms, and the practical application on fighter airplanes with thin airfoils is limited. Additionally, these mechanisms are adding up extra weight to the overall weight of an aircraft.

On the fighter airplanes that have wings with thin airfoils and sharp leading edge, it is not possible in reality to apply any of the solutions with movable slabs and therefore, completely movable front portion of wing without slots is used instead. In this situation, the aircraft wing can not be set to attack angles high enough for the extra lift production due to inability to control the boundary layer over the upper camber surface of wing.

For the production of extra lift on a trailing edge of wing, the prior art is using different design solutions of flaps with one or two slots disposed in front of flaps for the control of the boundary layer over an upper surface of flaps. For this purpose, there have been used different complex mechanisms for both making complex flaps' trajectories and synchronized motion of segments that form slots in front of flaps as it is the case in the following patents:

The U.S. Pat. No. 4,447,028 discloses a relatively simple mechanism for making a complex motion with the simultaneous extraction and lowering of flaps that have their pivotal locations situated under a lower surface of wing.

The U.S. Pat. Nos. 3,987,983 and 4,172,575 disclose mechanisms for deflection of the segments of flaps, which form two successive convergent slots for the control of the boundary layer over an upper surface of flap segments.

The disadvantages of all the formerly mentioned technical solutions of the prior art for flaps are such that very complex mechanisms are used, which require significant additional space out of contour of wing for their placement in order to make convergent slots with high convergence ratio and air flux capacity. On the other hand, by applying simple mechanisms, convergent slots can not be formed with air flux capacity high enough for efficient boundary layer control.

For the lift regulation and roll control of the aircraft, the prior art has been using maneuvering surfaces aileron and flaperon that are pivoted synchronically on the left and right wing in the opposite direction.

By using rotational movement of ailerons and flaperons, small movements of the actuating means cause augmented and rapid changes in the airflow on the wing surface due to change in camber and the attack angle of a wing airfoil providing high efficiency of roll control at higher speed of the aircraft.

A problem arises at low speed and higher attack angles of the aircraft where it is not possible to control the boundary layer over the upper camber surface of wing, which results in significantly lower efficiency of roll control.

In order to increase the efficiency of the roll control at low speeds of flight and in the landing phase on the fighter airplanes, prior art is using inboard flaperons in addition to outboard ailerons/flaperons, which results in the significant loss of extra lift on the aircraft wing.

The following patents tried to solve the problems of the roll control at low speed in different ways:

In the U.S. Pat. No. 4,015,787, it is disclosed that segment 13 is automatically deflected with the deflection of flaperon 14 creating a convergent slot for the control of the boundary layer over an upper camber surface of flaperon 14. However, this technical solution can not be used as the outboard aileron at high speed of flight.

In the U.S. Pat. No. 4,705,236, it is disclosed outboard ailerons without slots, which are used at higher speed of flight for roll control. By extracting the outboard aileron by means of track member at low speed of flight, slots are formed for the control of boundary layer over an upper camber surface of the aileron but without the possibility for the regulation of slot size and convergence simultaneously with the deflection of aileron in the maneuvering phase. In addition, this solution requires significant space for the placement of the regulating mechanism and actuating means out of wing contour.

The U.S. Pat. No. 3,921,942 discloses an application of the outboard ailerons without slots at high speed of flight and with slots at low speed of flight. However, the practical application of this solution faces significant difficulties due to problems regarding required rigidity on real constructions.

For the simultaneous yaw and roll maneuver at higher speeds, the prior art has been using maneuvering surface spoiler, which is functioning on the principle of loss of airlift and increase in drag only on one wing and it is not used for the stabilization of the aircraft and sharp yaw and roll maneuvers at low speeds.

BRIEF SUMMARY OF THE INVENTION

My slot forming segments and slot changing spoilers are used for the production and regulation of the extra lift on the aircraft wing. Accordingly, besides the objects and advantages of the patents described above in my patent application, several objects of my slot forming segments and slot changing spoilers are:

1. to provide for efficiency of maneuvering surfaces for roll control that are simultaneously used for extra lift production at low speeds and in the landing phase of the aircraft without significant loss of lift on the wings;
2. to provide for the regulation of drag on both wings during roll control when maneuvering surfaces are deployed for extra lift production;
3. to provide for a significant enlargement of the wings' surface area and increase in their camber for extra lift production at low speed and in the landing phase of the aircraft;

4. to provide for the efficient control of the boundary layer over the entire upper camber surface of wing when leading and trailing edge are deflected downwardly and the entire wing is set under a high attack angle especially on fighter airplanes with thin airfoils that have a sharp front portion of wing where solutions of the prior art for slabs can not be used;

5. to provide for the low drag and optimal deployment of the wings' maneuvering surfaces for the efficient maneuver at high speeds.

Further objects and advantages of my slot forming segments and slot changing spoilers are to provide for low weight of the aircraft, simple production, low cost, and a possibility for their implementation on the existing structures of the aircraft wings. Still further objects and advantages will become apparent from a consideration of the ensuing description and drawings.

Although the description contains many specifics, these should not be construed as limiting the scope of the invention but as merely providing illustrations of some of the presently preferred embodiments of this invention.

Thus the scope of the invention should be determined by the appended claims and their legal equivalents, rather than by the examples given.

BRIEF DESCRIPTION OF THE SEVERAL VIEWS OF THE DRAWING

FIG. 20 shows a longitudinal cross section view of the aircraft wing with a rotation of the slot changing spoiler in front of main portion relatively to the pivotal front portion.

FIG. 21 shows a longitudinal cross section view of the aircraft wing with a rotation of a slot changing spoiler in front of pivotal rear portion relatively to the main portion.

FIG. 22 shows a longitudinal cross section view of the aircraft wing with a rotation of a slot changing spoiler in front of movable rear portion relatively to the main portion.

REFERENCE NUMERALS IN DRAWING

32 main airfoil

Figure 1:
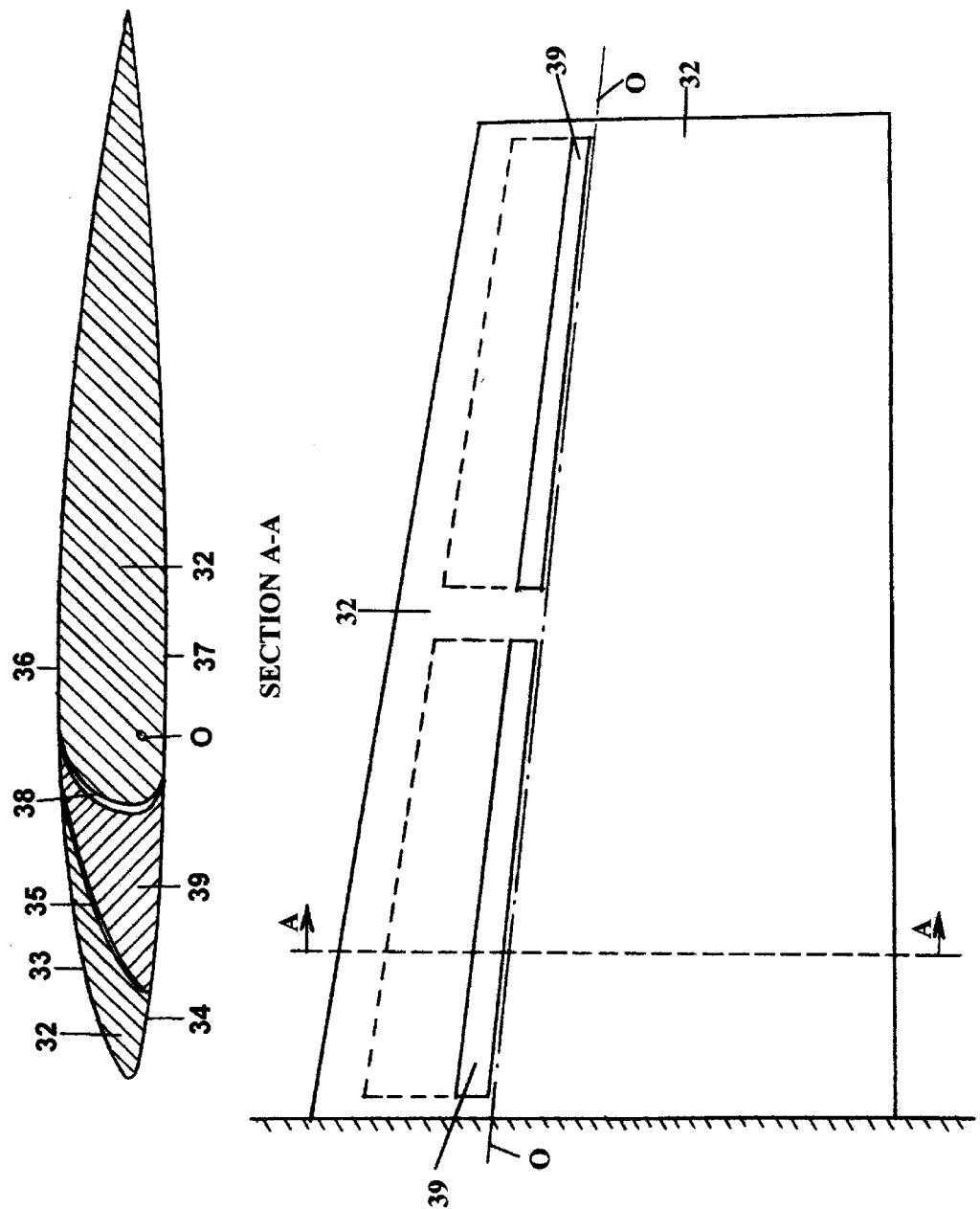
FIG. 1 shows a top plan view with a longitudinal cross section view of the aircraft wing with slot forming segments inserted within a fixed structure of the aircraft wing.

33 front section upper surface 34 front section under surface
35 front section rear surface
36 rear section upper surface
37 rear section under surface
38 rear section front surface
39 slot forming segment inserted into main airfoil
40 main portion
41 main portion upper surface
42 main portion under surface
43 main portion front surface
44 main portion rear surface in front of pivotal rear portion
45 main portion rear surface in front of movable rear portion
46 pivotal front portion
47 pivotal front portion upper surface
48 pivotal front portion under surface
49 pivotal front portion rear surface
50 pivotal rear portion
51 pivotal rear portion upper surface
52 pivotal rear portion under surface
53 pivotal rear portion front surface
54 movable rear portion
55 movable rear portion upper surface
56 movable rear portion under surface
57 movable rear portion front surface
58 slot forming segment in front of main portion
59 slot forming segment in front of pivotal rear portion
60 slot forming segment in front of movable rear portion
61 slot forming segment upper surface
62 slot forming segment under surface
63 slot forming segment front surface
64 slot forming segment rear surface
65 front edge of slot forming segment front surface
66 rear edge of slot forming segment front surface
67 upper edge of slot forming segment rear surface
68 lower edge of slot forming segment rear surface
69 slot changing spoiler in front of main portion
70 slot changing spoiler in front of pivotal rear portion
71 slot changing spoiler in front of movable rear portion
72 slot changing spoiler upper surface
73 slot changing spoiler under surface
74 rear edge of slot changing spoiler under surface
75 front edge of slot changing spoiler under surface

DETAILED DESCRIPTION OF THE INVENTION

A) STATIC DESCRIPTION-FIGS. 1–12

In FIGS. 1 to 12, it is shown the shapes, mutual connections, and the distances among the parts of the aircraft wing that deploys slot forming segments and slot changing spoilers.

In FIG. 1, it is shown the aircraft wing with main airfoil 32. Main airfoil 32 in its structure has a number of apertures that extend along a transverse axis of the aircraft wing. Each aperture splits main airfoil 32 along a longitudinal axis of the aircraft wing in a front section, which extends in front of the aperture, and a rear section, which extends behind the aperture. The shape of the front section of main airfoil 32 is defined with front section upper surface 33, front section under surface 34, and front section rear surface 35 (FIG. 1). The shape of the rear section of main airfoil 32 is defined with rear section upper surface 36, rear section under surface 37, and rear section front surface 38 (FIG. 1). The aperture within the structure of main airfoil 32 is bordered along the longitudinal axis with front section rear surface 35 from the front side and rear section front surface 38 from the rear side. Within the aperture of main airfoil 32, it is inserted slot forming segment 39 (FIG. 1).

Figure 6:
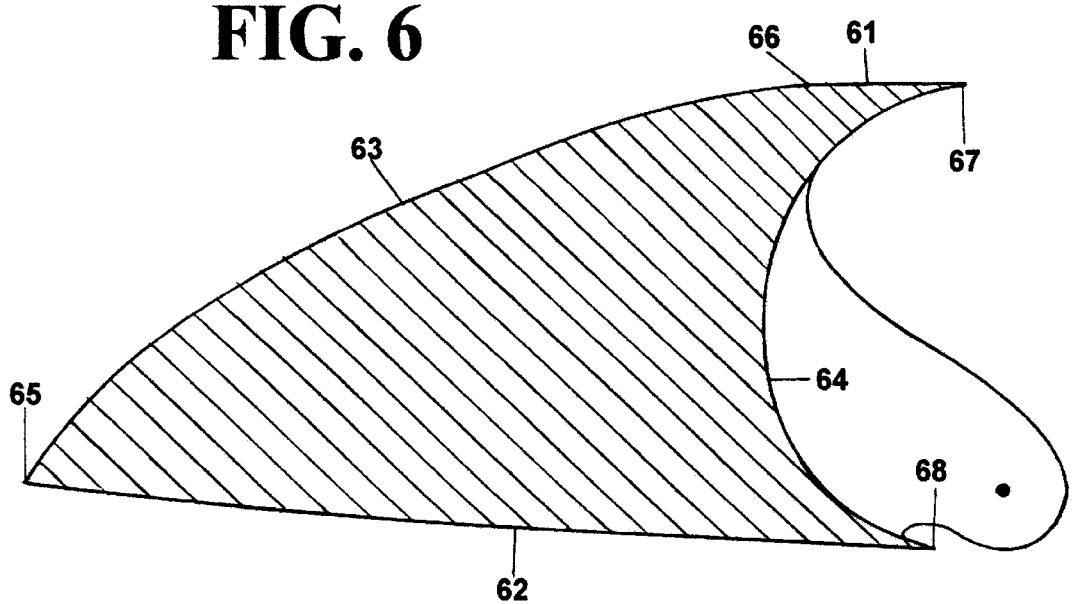

The shape of slot forming segment 39 is defined with slot forming segment upper surface 61, slot forming segment under surface 62, slot forming segment front surface 63, and slot forming segment rear surface 64 (FIG. 6). Slot forming segment front surface 63 extends from front edge of slot forming segment front surface 65 to rear edge of slot forming segment front surface 66 (FIG. 6). Slot forming segment rear surface 64 extends from upper edge of slot forming segment rear surface 67 to lower edge of slot forming segment rear surface 68 (FIG. 6). The shape of the aperture of main airfoil 32 along the longitudinal axis is suited to the shape of slot forming segment 39 (FIG. 1) so that in the stowed position of slot forming segment 39 inside the aperture of main airfoil 32, the edges of slot forming segment front surface 63 of slot forming segment 39 adhere on front section rear surface 35 from the under side closing a gap between the front section of main airfoil 32 and slot forming segment 39 (FIG. 1). Simultaneously, upper edge of slot forming segment rear surface 67 of slot forming segment 39 adheres on rear section front surface 38 closing a gap between slot forming segment 39 and the rear section of main airfoil 32. In the above mentioned stowed position of slot forming segment 39, slot forming segment upper surface 61 of slot forming segment 39, front section upper surface 33, and rear section upper surface 36 constitute an upper surface of main airfoil 32 with a smooth continuous curvature, and slot forming segment under surface 62 of slot forming segment 39, front section under surface 34, and rear section under surface 37 constitute an under surface of main airfoil 32 with a smooth continuous curvature.

Slot forming segment 39 is pivotally connected to the rear section of main airfoil 32 so that slot forming segment 39 from its stowed position can rotate around axis of rotation O (FIG. 1) relatively to main airfoil 32 downwardly only.

An upper segment of rear section front surface 38 is a cylindrical surface whose axis coincides with axis of rotation O permitting the unobstructed rotation of slot forming segment 39 around axis of rotation O relatively to main airfoil 32 simultaneously enabling the closure of the gap between slot forming segment 39 and the rear section of main airfoil 32 during the rotation.

Figure 2:
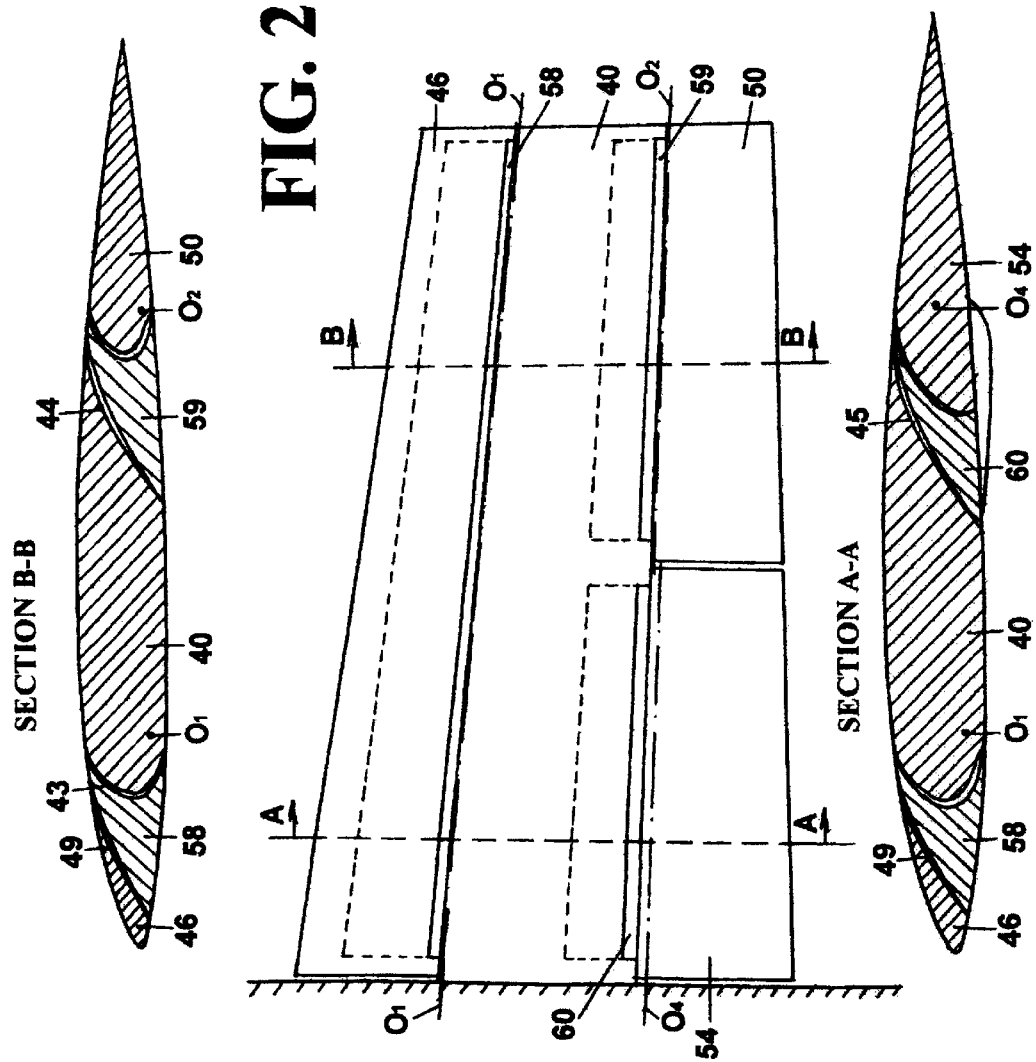
FIG. 2 shows a top plan view with two longitudinal section views of the aircraft wing with slot forming segments inserted between portions of wing, which are not fixed relatively to each other.

In FIG. 2, it is shown the aircraft wing comprising main portion 40, pivotal front portion 46, pivotal rear portion 50, and movable rear portion 54.

Pivotal front portion 46 that is disposed in front of main portion 40 has a carved trailing edge and a cove in which slot forming segment in front of main portion 58 is stowed.

Main portion 40 in the area of pivotal rear portion 50 has a carved trailing edge and a cove in which slot forming segment in front of pivotal rear portion 59 is stowed.

Main portion 40 in the area of movable rear portion 54 has a carved trailing edge and a cove in which slot forming segment in front of movable rear portion 60 is stowed.

Main portion 40 in the area of its coves has a shape defined with main portion upper surface 41, main portion under surface 42, main portion front surface 43 (FIG. 4), main portion rear surface in front of pivotal rear portion 44, and main portion rear surface in front of movable rear portion 45 (FIG. 2).

Pivotal front portion 46 in the area of its cove has a shape defined with pivotal front portion upper surface 47, pivotal front portion under surface 48 (FIG. 4), and pivotal front portion rear surface 49 (FIG. 2).

Figure 4:
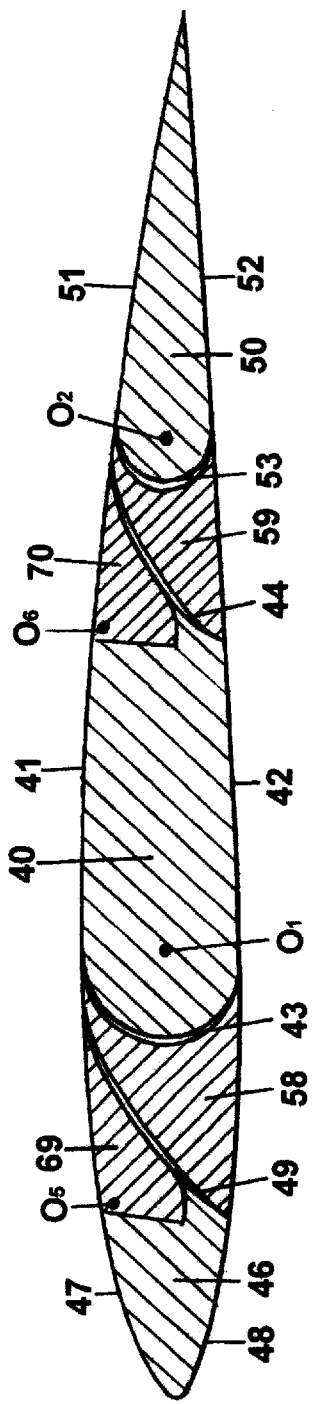
FIGS. 4, 5, 6, and 7 show longitudinal cross section views of the aircraft wing and shapes of parts of the wing that is using slot forming segments and slot changing spoilers.

Pivotal rear portion 50 has a shape defined with pivotal rear portion upper surface 51, pivotal rear portion under surface 52, and pivotal rear portion front surface 53 (FIG. 4).

Figure 5:
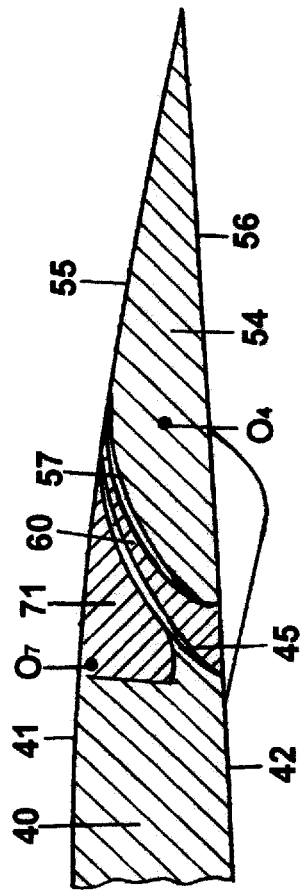

Movable rear portion 54 has a shape defined with movable rear portion upper surface 55, movable rear portion under surface 56, and movable rear portion front surface 57 (FIG. 5).

Slot forming segment 58, slot forming segment 59, and slot forming segment 60 have their shape defined with slot forming segment upper surface 61, slot forming segment under surface 62, slot forming segment front surface 63, and slot forming segment rear surface 64 (FIG. 6).

An intersection of slot forming segment front surface 63 and slot forming segment upper surface 61 defines rear edge of slot forming segment rear surface 66, and the intersection of slot forming segment front surface 63 and slot forming segment under surface 62 defines front edge of slot forming segment front surface 65 (FIG. 6).

An intersection of slot forming segment rear surface 64 and slot forming segment upper surface 61 defines upper edge of slot forming segment rear surface 67, and an intersection of slot forming segment rear surface 64 and slot forming segment under surface 62 defines under edge of slot forming segment rear surface 68 (FIG. 6).

Pivotal front portion 46 is pivotally connected to main portion 40 so that it can rotate around axis of rotation $O_1$ (FIG. 2).

The shape of pivotal front portion rear surface 49 and main portion front surface 43, as well as their mutual distance are adjusted to the shape of slot forming segment 58 enabling the disposal of slot forming segment 58 into the cove of the carved trailing edge of pivotal front portion 46.

Slot forming segment front surface 63 of slot forming segment 58 with its edges adheres on pivotal front portion rear surface 49 from the under side closing a gap between pivotal front portion 46 and slot forming segment 58 when slot forming segment 58 is stowed in the cove of pivotal front portion 46, and upper edge of slot forming segment rear surface 67 of slot forming segment 58 adheres on main portion front surface 43 closing a gap between slot forming segment 58 and main portion 40.

A curvature of slot forming segment upper surface 61 of slot forming segment 58 constitutes a portion of a smooth continuous curvature of an upper surface of the aircraft wing, and a curvature of slot forming segment under surface 62 of slot forming segment 58 constitutes a portion of a smooth continuous curvature of an under surface of the aircraft wing when slot forming segment 58 is in its stowed position and the aircraft wing is arranged for cruising speed configuration.

Slot forming segment 58 is pivotally connected to main portion 40 so that it can rotate around axis of rotation $O_1$ relatively to both main portion 40 and pivotal front portion 46.

An upper segment of main portion front surface 43 has a cylindrical shape (FIG. 8) whose axis coincides with axis of rotation $O_1$, which permits the unobstructed rotation of slot forming segment 58 relatively to main portion 40 and enables the closure of the gap between slot forming segment 58 and main portion 40 during this rotation.

Slot forming segment 58 from its stowed position rotates around axis of rotation $O_1$ relatively to pivotal front portion 46 downwardly only.

Actuating means, which engage pivotal front portion 46 into rotation around axis of rotation $O_1$ relatively to main portion 40, are connected to main portion 40, and actuating means, which engage slot forming segment 58 into the rotation around axis of rotation $O_1$ relatively to pivotal front portion 46, are connected only to pivotal front portion 46, which is why slot forming segment 58 and pivotal front portion 46 in any of their mutual positions or during their mutual relative rotation can simultaneously rotate around axis of rotation $O_1$ relatively to main portion 40.

Pivotal rear portion 50, which is disposed behind main portion 40 on the outboard wing, is pivotally connected to main portion 40 so that it can rotate around axis of rotation $O_2$ (FIG. 2) relatively to main portion 40.

The shape of main portion rear surface 44 and pivotal rear portion front surface 53, as well as their mutual distance are adjusted to the shape of slot forming segment 59 enabling the disposal of slot forming segment 59 inside the cove of the carved trailing edge of main portion 40 in the area of pivotal rear portion 50.

Slot forming segment front surface 63 of slot forming segment 59 with its edges adheres on main portion rear surface 44 from the under side closing a gap between main portion 40 and slot forming segment 59 when slot forming segment 59 is stowed into the cove of main portion 40, and upper edge of slot forming segment rear surface 67 of the slot forming segment 59 adheres on pivotal rear portion front surface 53 closing a gap between slot forming segment 59 and pivotal rear portion 50.

A curvature of slot forming segment upper surface 61 of slot forming segment 59 constitutes a portion of a smooth continuous curvature of the upper surface of the aircraft wing, and a curvature of slot forming segment under surface 62 of slot forming segment 59 constitutes a portion of a smooth continuous curvature of the under surface of the aircraft wing when slot forming segment 59 is in its stowed position and the aircraft wing is arranged for cruising speed configuration.

Slot forming segment 59 is pivotally connected to main portion 40 so that it can rotate around axis of rotation $O_2$ relatively to both main portion 40 and pivotal rear portion 50.

Slot forming segment 59 from its stowed position rotates around axis of rotation $O_2$ relatively to main portion 40 downwardly only.

An upper segment of pivotal rear portion front surface 53 has a cylindrical shape (FIG. 9) whose axis coincides with axis of rotation $O_2$ that permits the unobstructed rotation of slot forming segment 59 around axis of rotation $O_2$ relatively to pivotal rear portion 50 simultaneously enabling the closure of the gap between slot forming segment 59 and pivotal rear portion 50 during this rotation.

Actuating means, which engage slot forming segment 59 into rotation around axis of rotation $O_2$ relatively to main portion 40, are connected to main portion 40 independently from actuating means that engage pivotal rear portion 50 to rotate around axis of rotation $O_2$ relatively to main portion 40 permitting in this way the rotation of slot forming segment 59 around the axis of rotation $O_2$ relatively to both main portion 40 and pivotal rear portion 50 in every mutually relative position of main portion 40 and pivotal rear portion 50, as well as during the rotation of pivotal rear portion 50 around axis of rotation $O_2$ relatively to main portion 40.

Movable rear portion 54, which is disposed behind main portion 40 on the inboard wing, is movably connected to main portion 40 so that it can extract backwards and rotate downwardly relatively to main portion 40.

The shape of main portion rear surface 45 and movable rear portion front surface 57, as well as their mutual distance are adjusted to the shape of slot forming segment 60 enabling the disposal of slot forming segment 60 into the cove of the trailing edge of main portion 40 in the area of movable rear portion 54 when movable rear portion 54 is in a retracted position relatively to main portion 40.

Slot forming segment front surface 63 of slot forming segment 60 with its edges adheres on main portion rear surface 45 from the under side closing a gap between main portion 40 and slot forming segment 60, and movable rear portion front surface 57 with its front edge adheres on slot forming segment rear surface 64 of slot forming segment 60 closing a gap between slot forming segment 60 and movable rear portion 54 when slot forming segment 60 is stowed into the cove of main portion 40 and movable rear portion 54 is in the retracted position relatively to main portion 40. In the situation when slot forming segment 60 is in its stowed position, movable rear portion 54 is in the retracted position relatively to main portion 40, and the aircraft wing is arranged for cruising speed configuration, a curvature of slot forming segment upper surface 61 of slot forming segment 60 constitutes a portion of a smooth continuous curvature of the upper surface of the aircraft wing, and a curvature of slot forming segment under surface 62 of slot forming segment 60 constitutes a portion of a smooth continuous curvature of the under surface of the aircraft wing.

Slot forming segment 60 is pivotally connected to main portion 40 so that it can rotate around axis of rotation $O_4$ relatively to both main portion 40 and movable rear portion 54 but only when movable rear portion 54 is disconnected from slot forming segment 60.

Slot forming segment 60 can rotate around axis of rotation $O_4$ from its stowed position relatively to main portion 40 downwardly only.

The position of axis of rotation $O_4$ relatively to slot forming segment 60 and movable rear portion 54 when movable rear portion 54 is deployed for high lift production is such that in the outer most deflected position of slot forming segment 60 relatively to main portion 40, upper edge of slot forming segment rear surface 67 of slot forming segment 60 tightly adheres on movable rear portion front surface 57 closing the gap between slot forming segment 60 and movable rear portion 54.

Actuating means, which engage slot forming segment 60 to rotate around axis of rotation $O_4$ relatively to main portion 40, are connected to main portion 40 independently from actuating means that engage movable rear portion 54 to deflect from main portion 40. Actuating means, which engage slot forming segment 60 to rotate around axis of rotation $O_4$, can be activated only when movable rear portion 54 is detached from slot forming segment 60.

The common feature of each slot forming segment is such that front edge of slot forming segment front surface 65 and rear edge of slot forming segment front surface 66 are disposed in front of the axis of rotation of the slot forming segment. The distance between front edge of slot forming segment front surface 65 and the axis of rotation of the slot forming segment is multiply longer than the distance between rear edge of slot forming segment front surface 66 and the axis of rotation of the slot forming segment.

Figure 3:
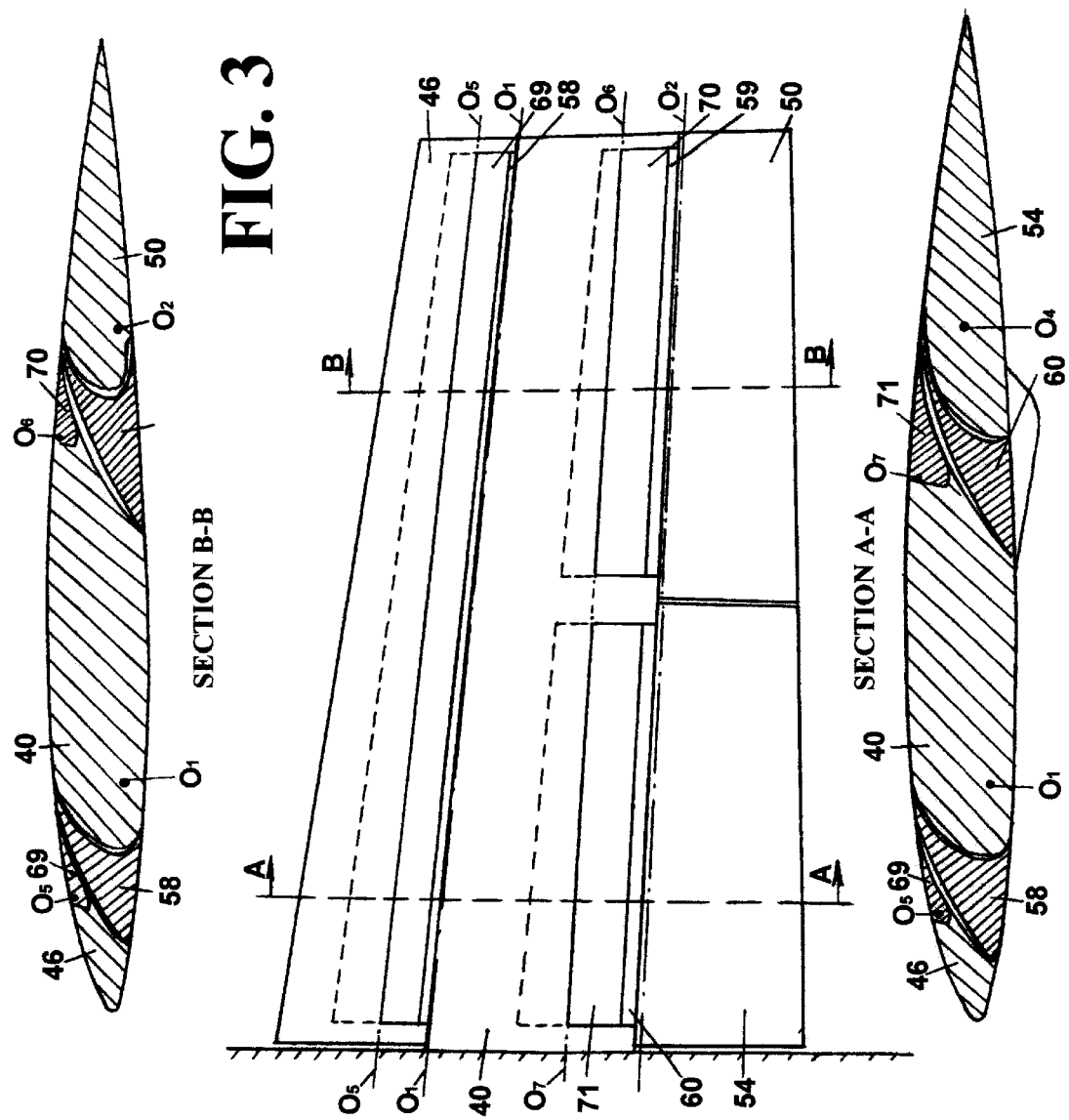
FIG. 3 shows a top plan view with two longitudinal section views of the aircraft wing with slot forming segments and slot changing spoilers inserted between portions of wing, which are not fixed relatively to each other.

In FIG. 3, it is shown the aircraft wing that comprises the same portions 40, 46, 50, and 54, as well as the same slot forming segments 58, 59, and 60 as it is shown in the FIG. 2. The differences between the wing shown in the FIG. 2 and the wing in the FIG. 3 are as follows:

a) a rear section of the carved trailing edge of pivotal front portion 46 in the area of its cove is cut off and replaced with slot changing spoiler in front of main portion 69 that is pivotally connected to pivotal front portion 46 so that slot changing spoiler 69 can rotate around axis of rotation $O_5$;

b) a rear section of the carved trailing edge of main portion 40 in the area of the cove in front of pivotal rear portion 50 is cut off and replaced with slot changing spoiler in front of pivotal rear portion 70 that is pivotally connected to main portion 40 so that slot changing spoiler 70 can rotate around axis of rotation $O_6$;

c) a rear section of the carved trailing edge of main portion 40 in the area of the cove in front of movable rear portion 54 is cut off and replaced with slot changing spoiler in front of movable rear portion 71 that is pivotally connected to main portion 40 so that slot changing spoiler 71 can rotate around axis of rotation $O_7$.

Slot changing spoiler 69 is disposed immediately in front of and above slot forming segment 58, slot changing spoiler 70 is disposed immediately in front of and above slot forming segment 59, and slot changing spoiler 71 is disposed immediately in front of and above slot forming segment 60.

Figure 7:
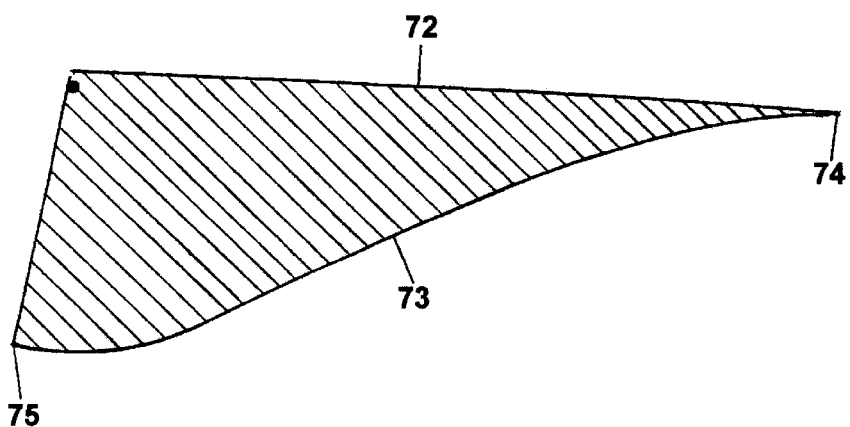
Figure 8:
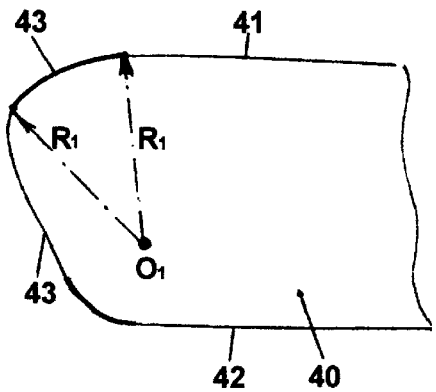
FIGS. 8, 9, 10, 11, and 12 show specific shapes of some surfaces that define parts of the aircraft wing that is using slot forming segments and slot changing spoilers.
Figure 9:
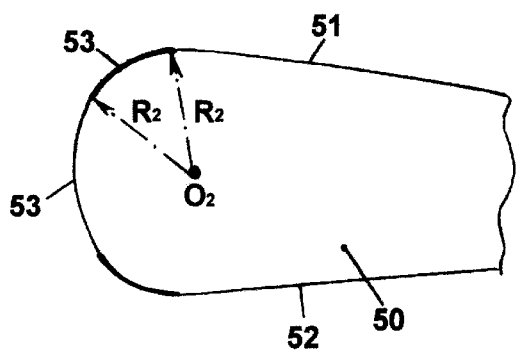

Slot changing spoilers 69, 70, and 71 have their shape defined with slot changing spoiler upper surface 72 and slot changing spoiler under surface 73 (FIG. 7). Slot changing spoiler under surface 73 extends from rear edge of slot changing spoiler under surface 74 to front edge of slot changing spoiler under surface 75. Rear edge of slot changing spoiler under surface 74 is defined with an intersection of slot changing spoiler upper surface 72 and slot changing spoiler under surface 73.

Slot changing spoiler upper surface 72 of slot changing spoilers 69, 70, and 71 constitute portions of the upper surface of the aircraft wing with smooth continuous curvature when slot changing spoilers 69, 70, and 71 are in their cruising sped positions.

By cutting off the rear section of the carved trailing edge of pivotal front portion 46, pivotal front portion rear surface 49 is shortened and extends from pivotal front portion under surface 48 to slot changing spoiler under surface 73 of slot changing spoiler 69 (FIG. 4).

By cutting off the rear sections of the carved trailing edges of main portion 40, main portion rear surface 44 is shortened and extends from main portion under surface 42 to slot changing spoiler under surface 73 of slot changing spoiler 70 (FIG. 4) and main portion rear surface 45 is shortened as well and extends from main portion under surface 42 to slot changing spoiler under surface 73 of slot changing spoiler 71 (FIG. 5).

Figure 10:
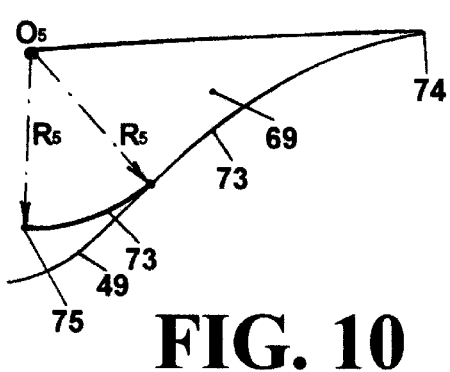

Pivotal front portion rear surface 49 and a portion of slot changing spoiler under surface 73 of slot changing spoiler 69, which extends from a connecting line between pivotal front portion rear surface 49 and slot changing spoiler under surface 73 of slot changing spoiler 69 backwards, constitute a continuous curvature conformed to a curvature of slot forming segment front surface 63 of slot forming segment 58. The rest of slot changing spoiler under surface 73 of slot changing spoiler 69, which extends from the connecting line between pivotal front portion rear surface 49 and slot changing spoiler under surface 73 of slot changing spoiler 69 forward on, has a cylindrical shape whose axis coincides with axis of rotation $O_5$ as shown in FIG. 10.

Figure 11:
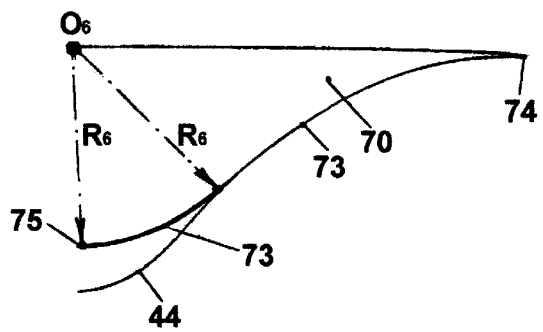
Figure 12:
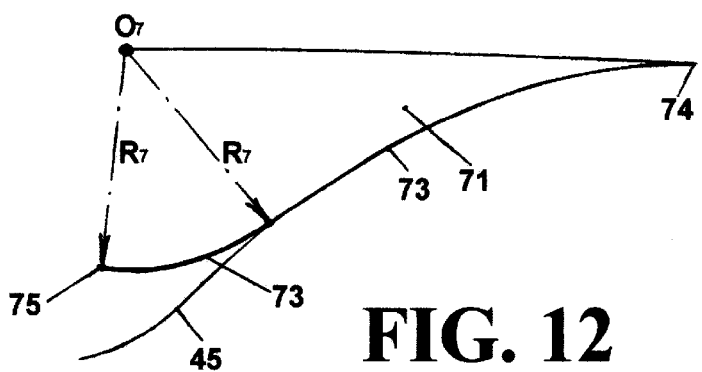

In the same way, it is defined the shape of slot changing spoiler under surface 73 of slot changing spoiler 70 and its position relatively to both main portion rear surface 44 and axis of rotation $O_6$ as shown on Fig 11, as well as the shape of slot changing spoiler under surface 73 of slot changing spoiler 71 and its position relatively to both main portion rear surface 45 and axis of rotation $O_7$ as shown on FIG. 12.

In the stowed position of slot forming segment 58 and the cruising speed position of slot changing spoiler 69, front edge of slot forming segment front surface 65 of slot forming segment 58 adheres on pivotal front portion rear surface 49 and rear edge of slot changing spoiler under surface 74 of slot changing spoiler 69 adheres on slot forming segment front surface 63 of slot forming segment 58.

In the stowed position of slot forming segment 59 and the cruising speed position of slot changing spoiler 70, front edge of slot forming segment front surface 65 of slot forming segment 59 adheres on main portion rear surface 44 and rear edge of slot changing spoiler under surface 74 of slot changing spoiler 70 adheres on slot forming segment front surface 63 of slot forming segment 59.

In the stowed position of slot forming segment 60 and the cruising speed position of slot changing spoiler 71, front edge of slot forming segment front surface 65 of slot forming segment 60 adheres on main portion rear surface 45 and rear edge of slot changing spoiler under surface 74 of slot changing spoiler 71 adheres on slot forming segment front surface 63 of slot forming segment 60.

Slot changing spoilers 69, 70, and 71 can rotate around their respective axes $O_5$, $O_6$, and $O_7$ from their cruising speed positions upwards only.

Actuating means, which engage each of the slot changing spoilers to rotate around their respective axes, are connected to the portions of the wing for which the slot changing spoilers are pivotally connected and independent from the actuating means that engage the other movable and pivotal parts of the aircraft wing.

B) OPERATION-FIGS 13 TO 31

In FIGS. 13 to 31, it is shown the possibilities for the mutual movements of parts of the aircraft wing that incorporates slot forming segments and slot changing spoilers.

Figure 13:
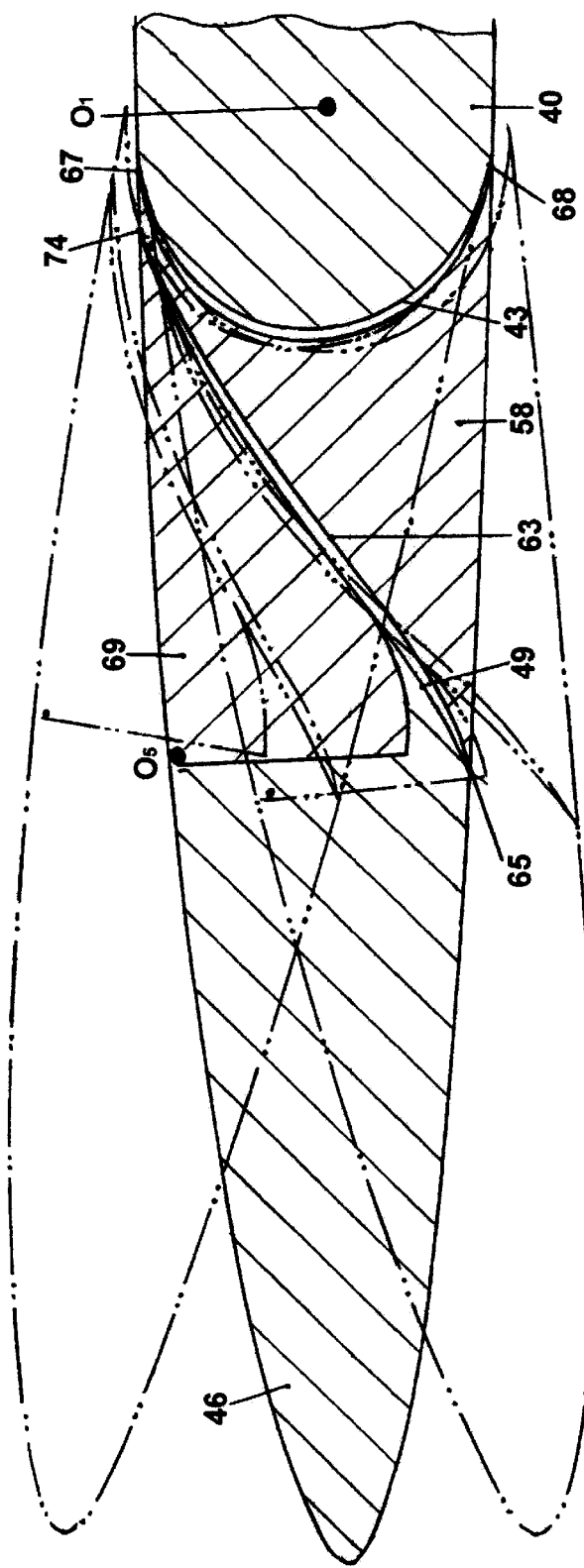
FIG. 13 shows a longitudinal cross section view of the aircraft wing with a rotation of a pivotal front portion of wing together with both a slot forming segment in front of main portion and a slot changing spoiler in front of main portion relatively to a main portion.

In FIG. 13, it is shown the rotation of pivotal front portion 46 together with both slot forming segment 58, which is stowed into the cove of the carved trailing edge of pivotal front portion 46, and slot changing spoiler 69, which adheres on slot forming segment 58, around axis of rotation $O_1$ thereby changing the camber of the aircraft wing airfoil.

Figure 14:
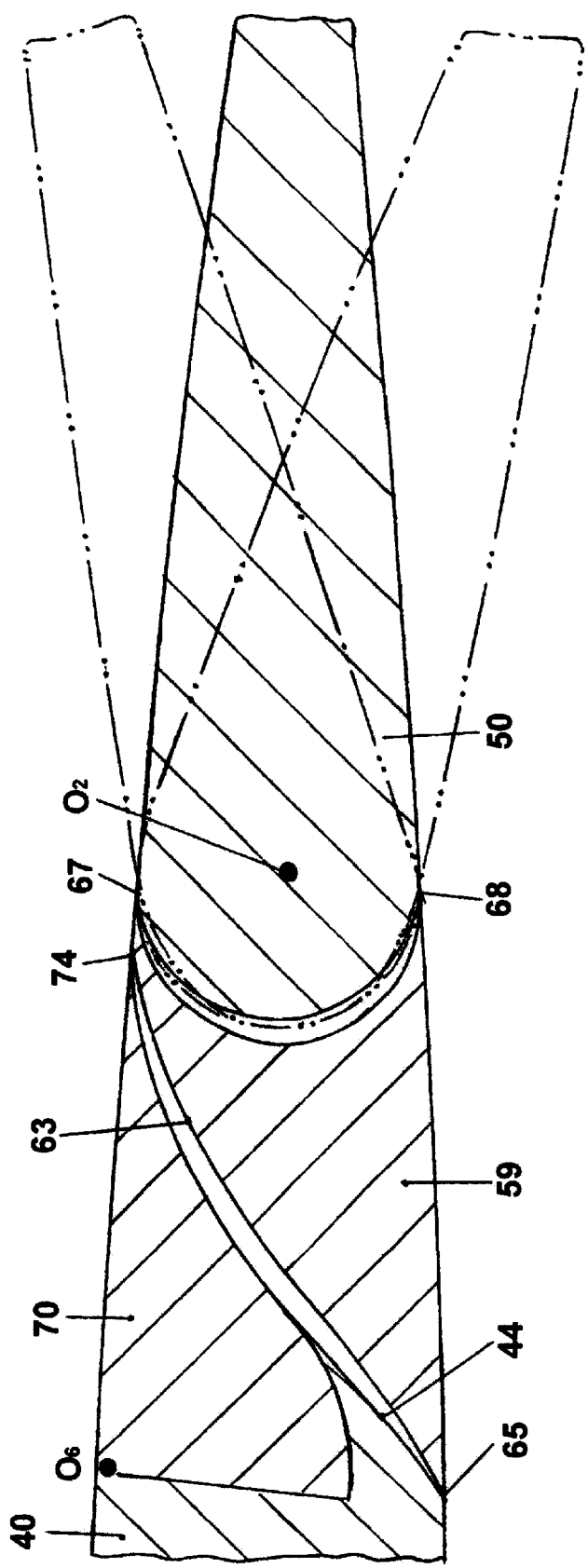
FIG. 14 shows a longitudinal section view of the aircraft wing with a rotation of a pivotal rear portion relatively to both the main portion and a slot forming segment in front of pivotal rear portion.

In FIG. 14, it is shown the rotation of pivotal rear portion 50 around axis of rotation $O_2$ relatively to main portion 40 when slot forming segment 59 is stowed into the cove of the carved trailing edge of main portion 40 in the area of pivotal rear portion 50 and slot changing spoiler 70 adheres onto slot forming segment 59 thereby changing the camber of the aircraft wing airfoil in the area of pivotal rear portion 50.

Figure 15:
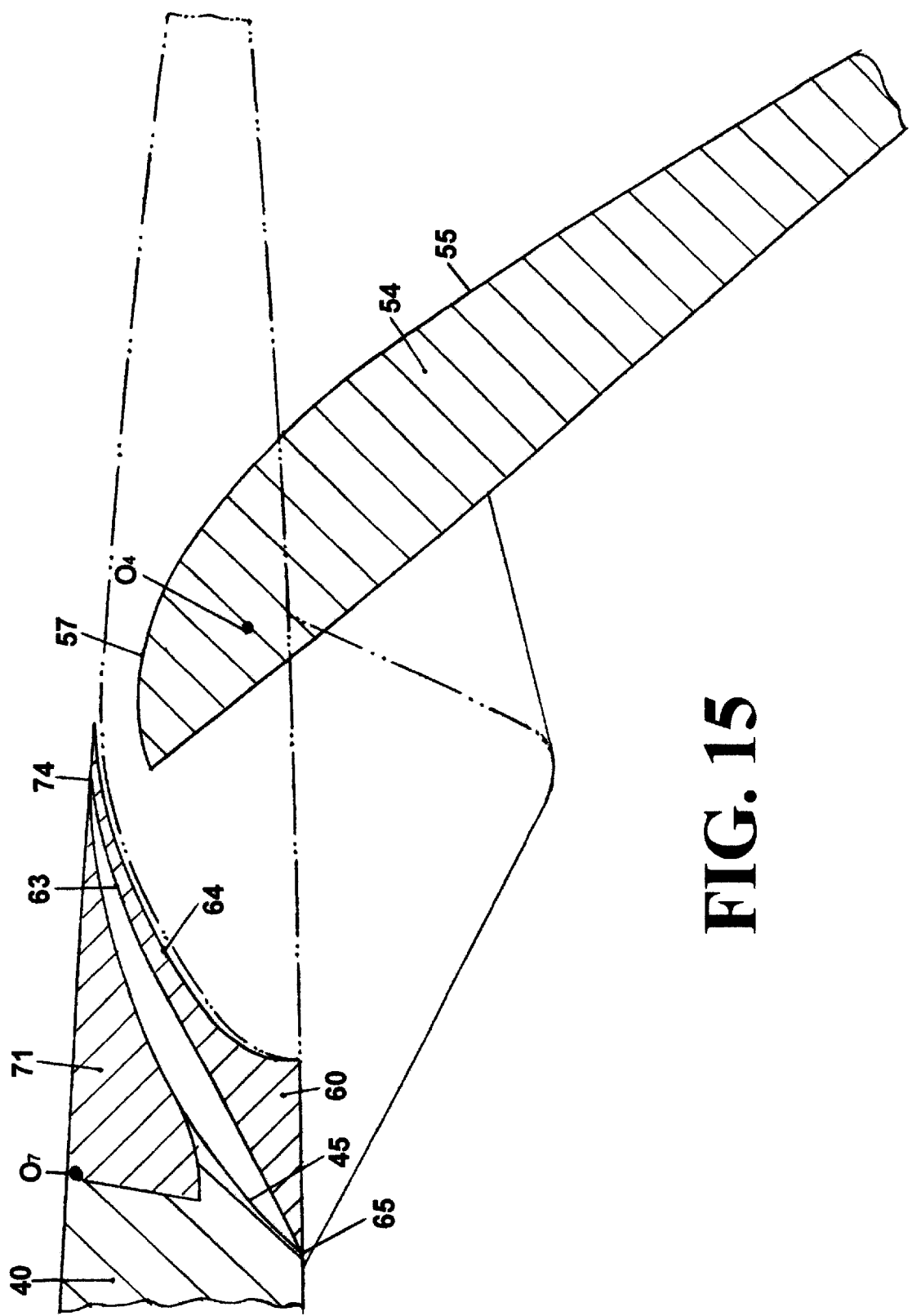
FIG. 15 shows a longitudinal cross section view of the aircraft wing with a motion of a movable rear portion relatively to both the main portion and a slot forming segment in front of movable rear portion.

In FIG. 15, it is shown the deflection of movable rear portion 54 relatively to main portion 40 when slot forming segment 60 is stowed into the cove of the carved trailing edge of main portion 40 in the area of movable rear portion 54 and slot changing spoiler 71 adheres on slot forming segment 60 thereby changing the camber of the aircraft wing airfoil in the area of movable rear portion 54 and simultaneously forming a slot between slot forming segment 60 and movable rear portion 54 for the control of the boundary layer over movable rear portion upper surface 55.

Figure 16:
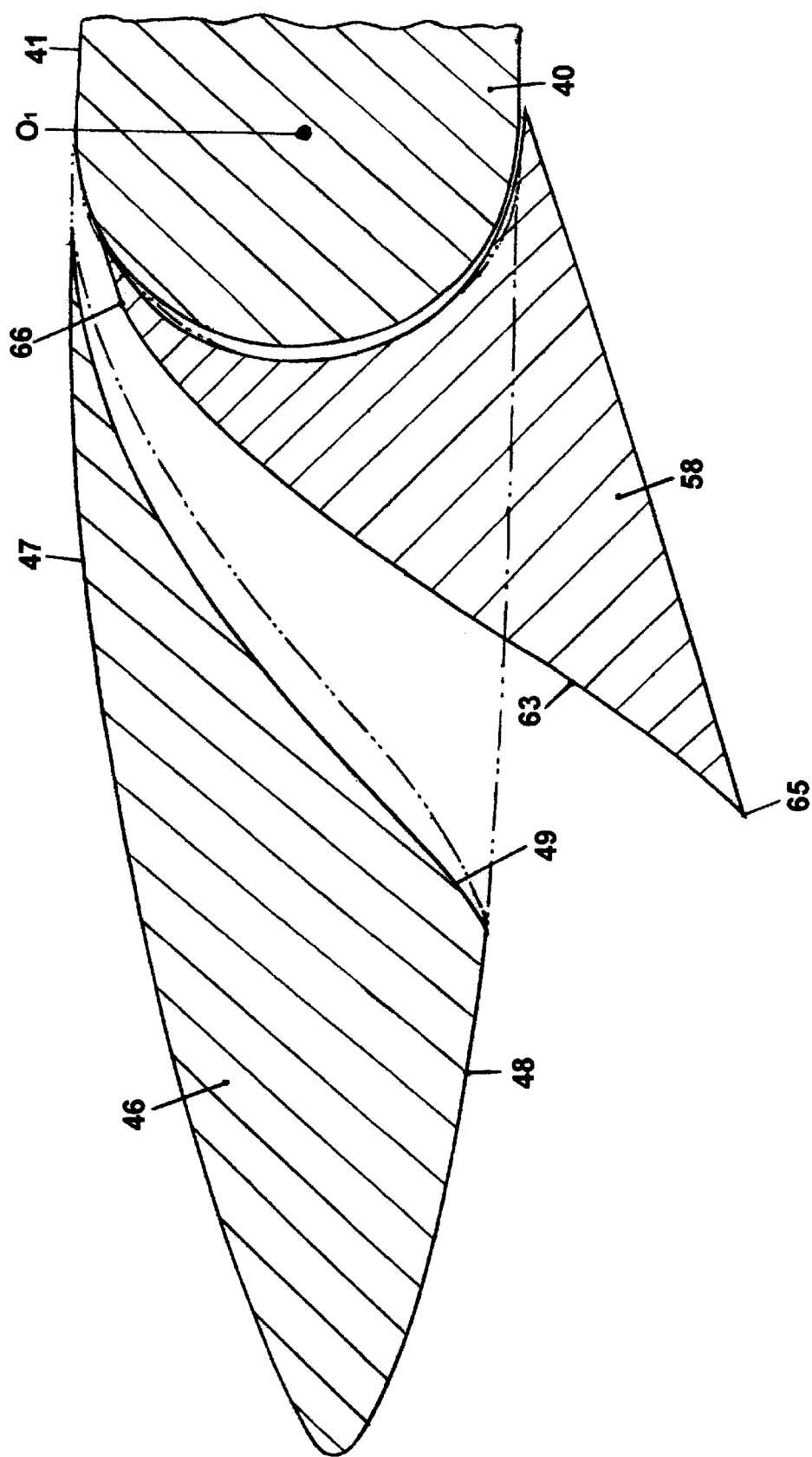
FIG. 16 shows a longitudinal cross section view of the aircraft wing with a rotation of the slot forming segment in front of main portion relatively to the pivotal front portion and the formation of a convergent slot ahead of the slot forming segment in front of main portion.

In FIG. 16, it is shown the rotation of slot forming segment 58 around axis of rotation $O_1$ from its stowed position downwardly relatively to pivotal front portion 46 thereby forming a slot between pivotal front portion 46 and slot forming segment 58. This slot is convergent in the direction of airflow that is directed from pivotal front portion under surface 48 to main portion upper surface 41. The size of the convergent slot's inlet depends on the angle for which slot forming segment 58 is deflected from its stowed position as well as the distance between front edge of slot forming segment front surface 65 of slot forming segment 58 and axis of rotation $O_1$. The convergence ratio of the convergent slot depends on the ratio of the distance between front edge of slot forming segment front surface 65 of slot forming segment 58 and axis of rotation $O_1$ and the distance between rear edge of slot forming segment front surface 66 of slot forming segment 58 and axis of rotation $O_1$, as well as the angle between a plain that goes through front edge of slot forming segment front surface 65 of slot forming segment 58 and axis of rotation $O_1$ and a plain that goes through rear edge of slot forming segment front surface 66 of slot forming segment 58 and axis of rotation $O_1$. This convergent slot provides for the control of the boundary layer over main portion upper surface 41. Besides, by detaching slot forming segment 58 from pivotal front portion 46, slot forming segment 58 and main portion 40 form a new aerodynamic embodiment with increased camber and surface area compared to the camber and surface area of main portion 40.

Figure 17:
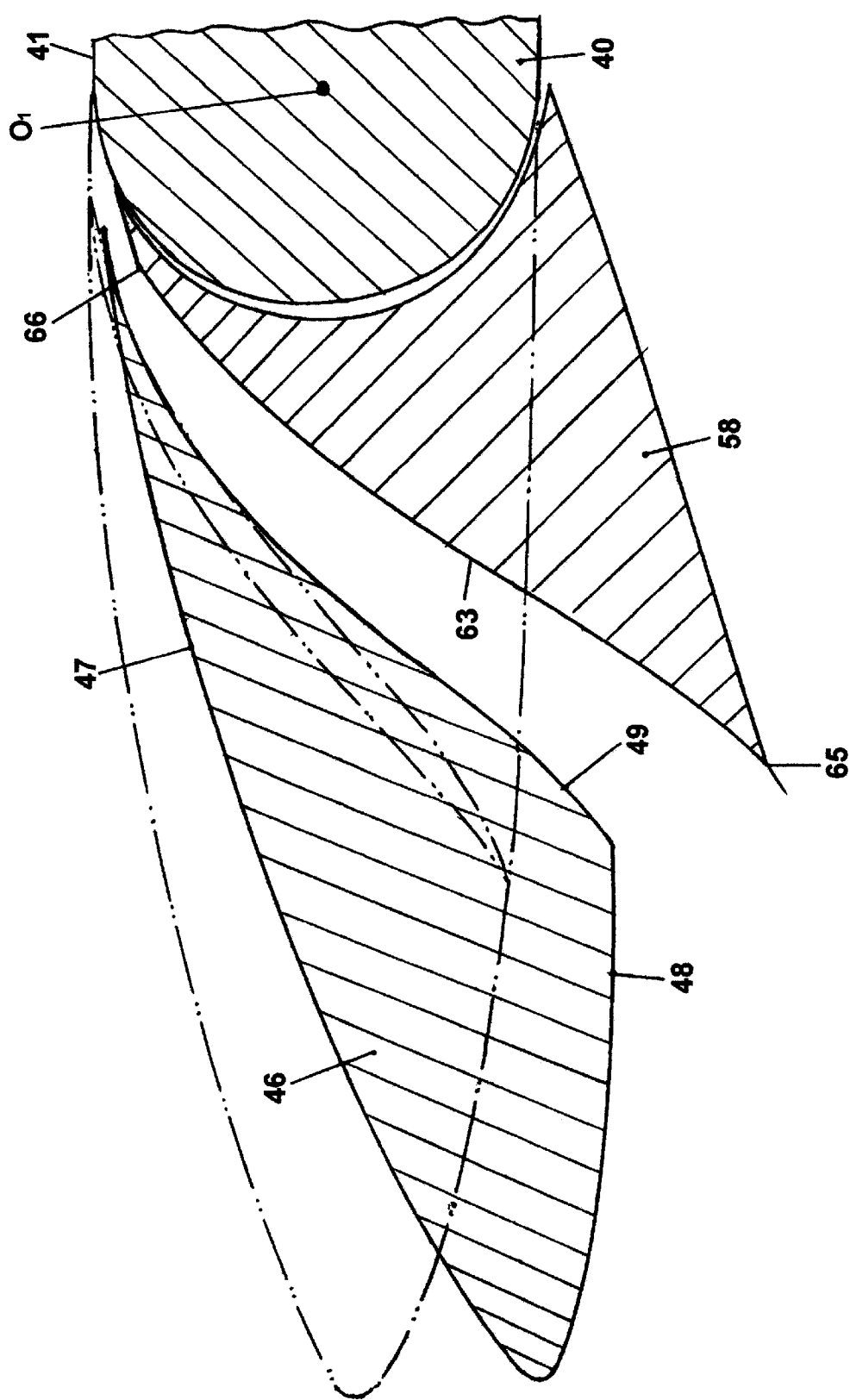
FIG. 17 shows a longitudinal cross section view of the aircraft wing with the simultaneous rotation of the pivotal front portion relatively to the main portion and the rotation of the slot forming segment in front of main portion relatively to the pivotal front portion.

In FIG. 17, it is shown the simultaneous rotation of pivotal front portion 46 around axis of rotation $O_1$ relatively to main portion 40 and slot forming segment 58 around axis of rotation $O_1$ relatively to pivotal front portion 46. In addition to the formation of the new aerodynamic embodiment made of slot forming segment 58 and main portion 40 and the formation of the convergent slot in front of slot forming segment 58 for the control of the boundary layer over main portion upper surface 41 as described for FIG. 16, by means of the rotation as shown in FIG. 17, it is possible to position pivotal front portion 46 under an optimal attack angle for its own high lift production.

Figure 18:
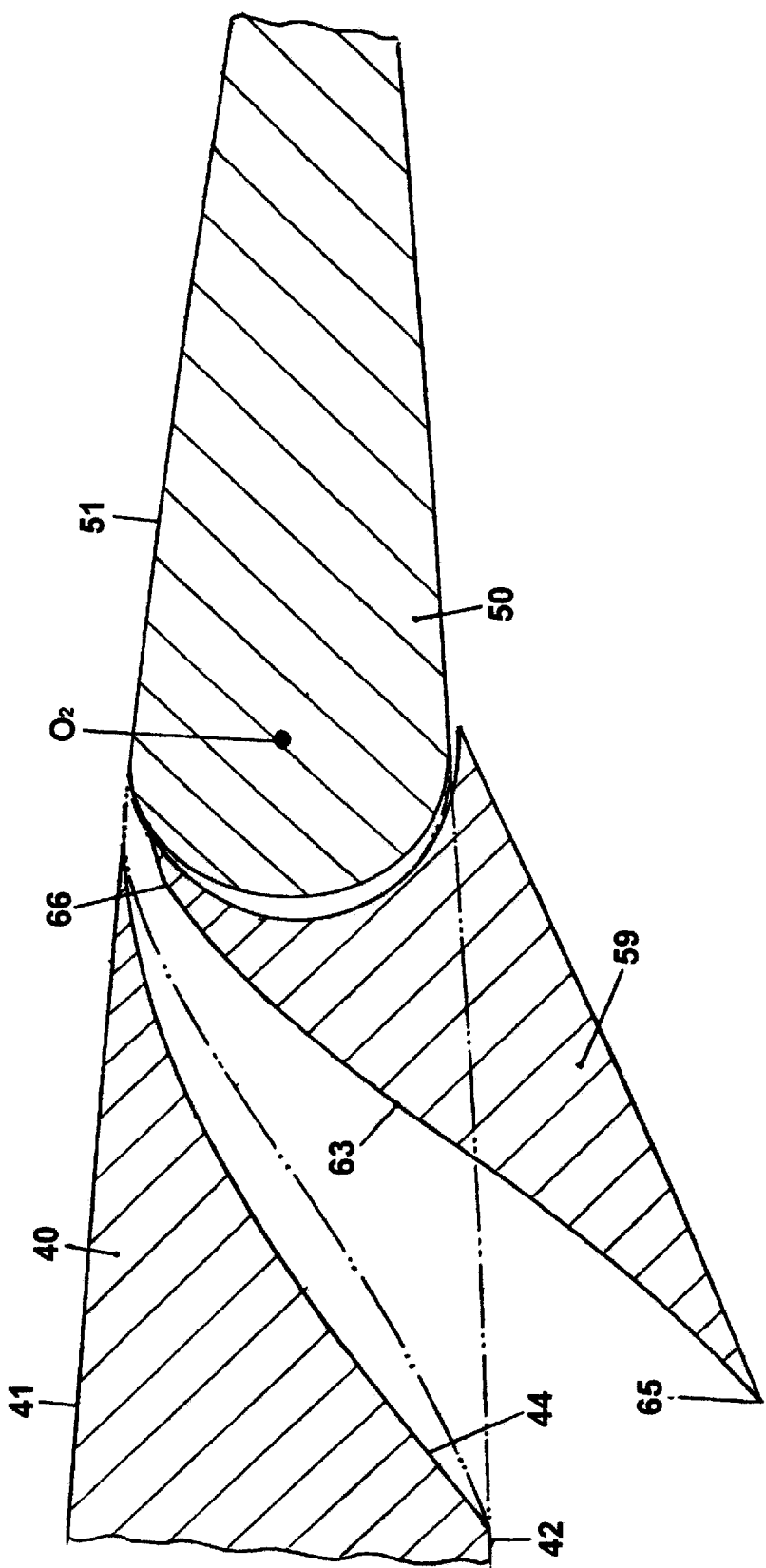
FIG. 18 shows a longitudinal cross section view of the aircraft wing with a rotation of the slot forming segment in front of pivotal rear portion relatively to the main portion and the formation of a convergent slot ahead of the slot forming segment in front of pivotal rear portion.

In FIG. 18, it is shown the rotation of slot forming segment 59 around axis of rotation $O_2$ from its stowed position downwardly relatively to main portion 40 thereby forming a convergent slot between main portion 40 and slot forming segment 59. This slot is convergent in the direction of airflow that is directed from main portion under surface 42 to pivotal rear portion upper surface 51 providing the control of the boundary layer over pivotal rear portion upper surface 51. In addition, by detaching slot forming segment 59 from main portion 40, slot forming segment 59 and pivotal rear portion 50 form a new aerodynamic embodiment with increased camber and surface area compared to the camber and surface area of pivotal rear portion 50.

Figure 19:
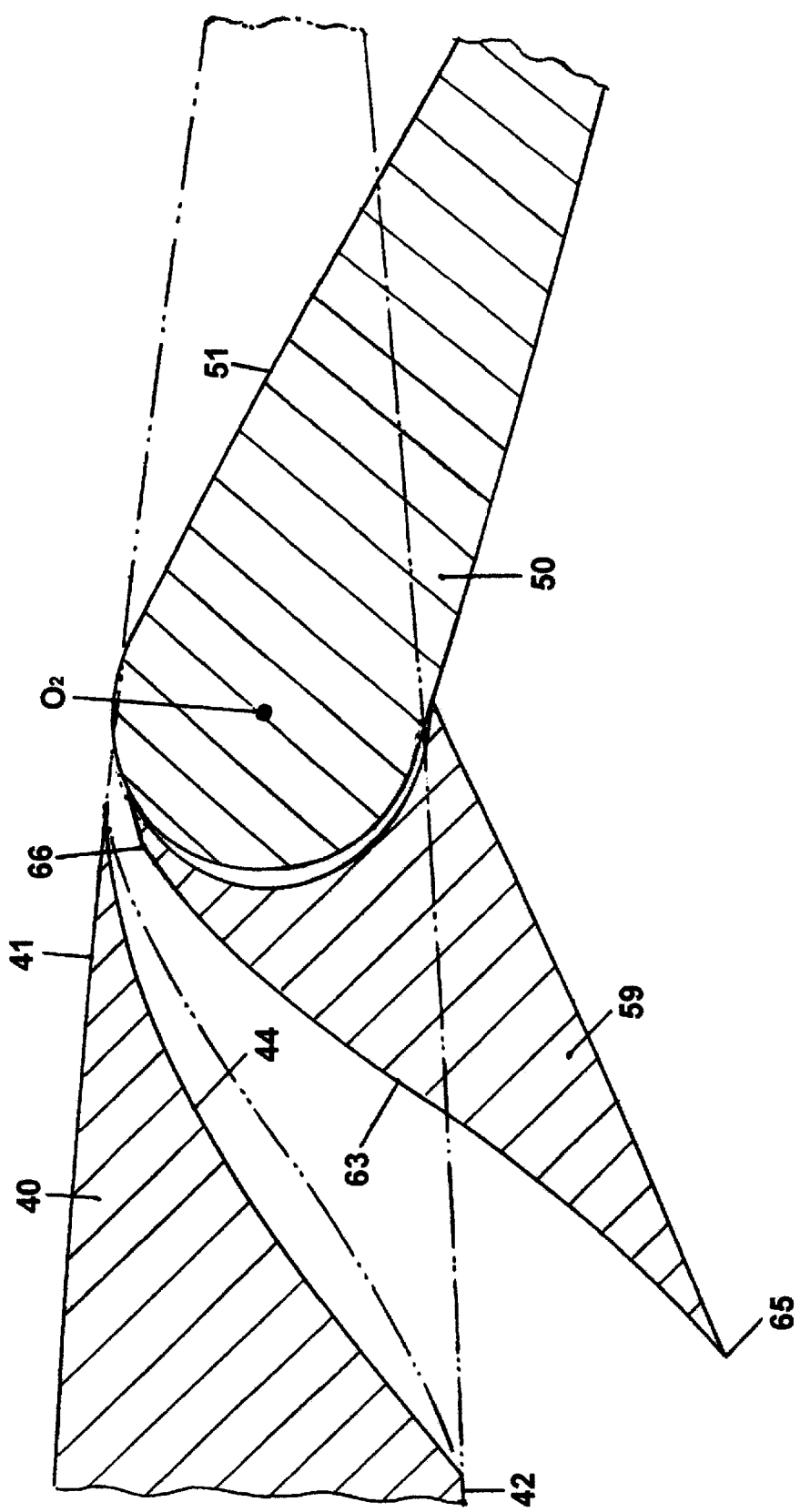
FIG. 19 shows a longitudinal cross section view of the aircraft wing with the simultaneous rotation of the pivotal rear portion and the slot forming segment in front of pivotal rear portion relatively to the main portion.

In FIG. 19, it is shown the simultaneous rotation of slot forming segment 59 and pivotal rear portion 50 around axis of rotation $O_2$ downwardly relatively to main portion 40. In addition to the effects produced with the rotation of slot forming segment 59 as described for FIG. 18, by means of the rotation as shown in FIG. 19, it is increased the camber of the aircraft wing airfoil in the area of pivotal rear portion 50, as well as the camber of the new aerodynamic embodiment formed by slot forming segment 59 and pivotal rear portion 50.

In FIGS. 20, 21, and 22, it is shown the rotation of slot changing spoilers 69, 70, and 71 around their respective axes $O_5$, $O_6$, and $O_7$ in the situation when the slot forming segments, which are disposed immediately under and behind the slot changing spoilers, are in their stowed positions forming the unintermittent under surface of the aircraft wing so that the slot changing spoilers function as the classical spoilers of the aircraft wing.

Figure 23:
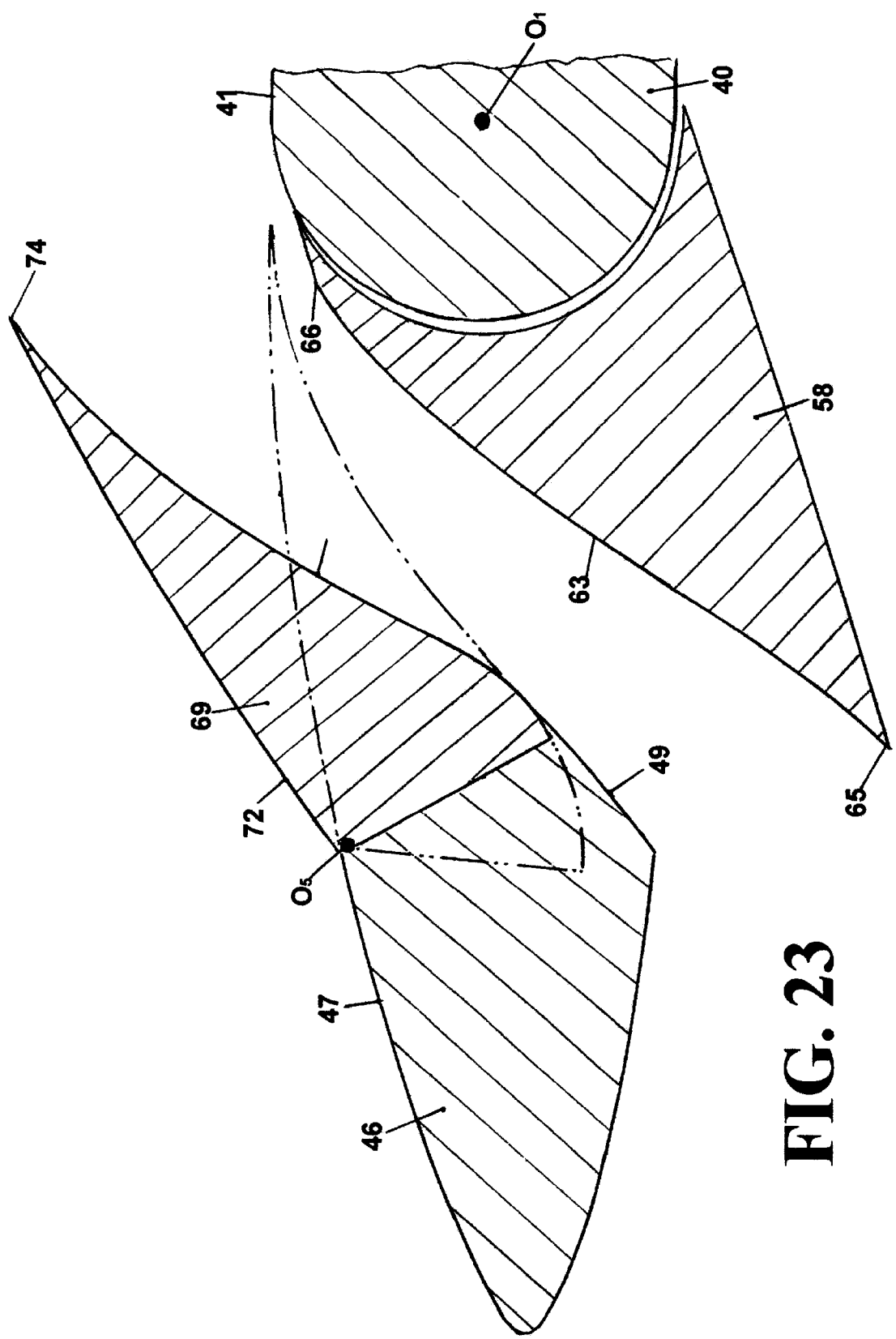
FIG. 23 shows a longitudinal cross section view of the aircraft wing with a rotation of the slot changing spoiler in front of main portion and the change in the convergence of the convergent slot.

In FIG. 23, it is shown the rotation of slot changing spoiler 69 around its axis of rotation $O_5$ upwards in the situation when slot forming segment 58 is deflected downwardly relatively to pivotal front portion 46 and a convergent slot between slot forming segment 58 on one side and pivotal front portion 46 and slot changing spoiler 69 on the other side is formed. In this situation, in addition to the change in camber of the upper surface of the aircraft wing in front of slot changing spoiler 69, it is changed the convergence ratio of the convergent slot between slot forming segment 58 on one side and pivotal front portion 46 and slot changing spoiler 69 on the other side.

Figure 24:
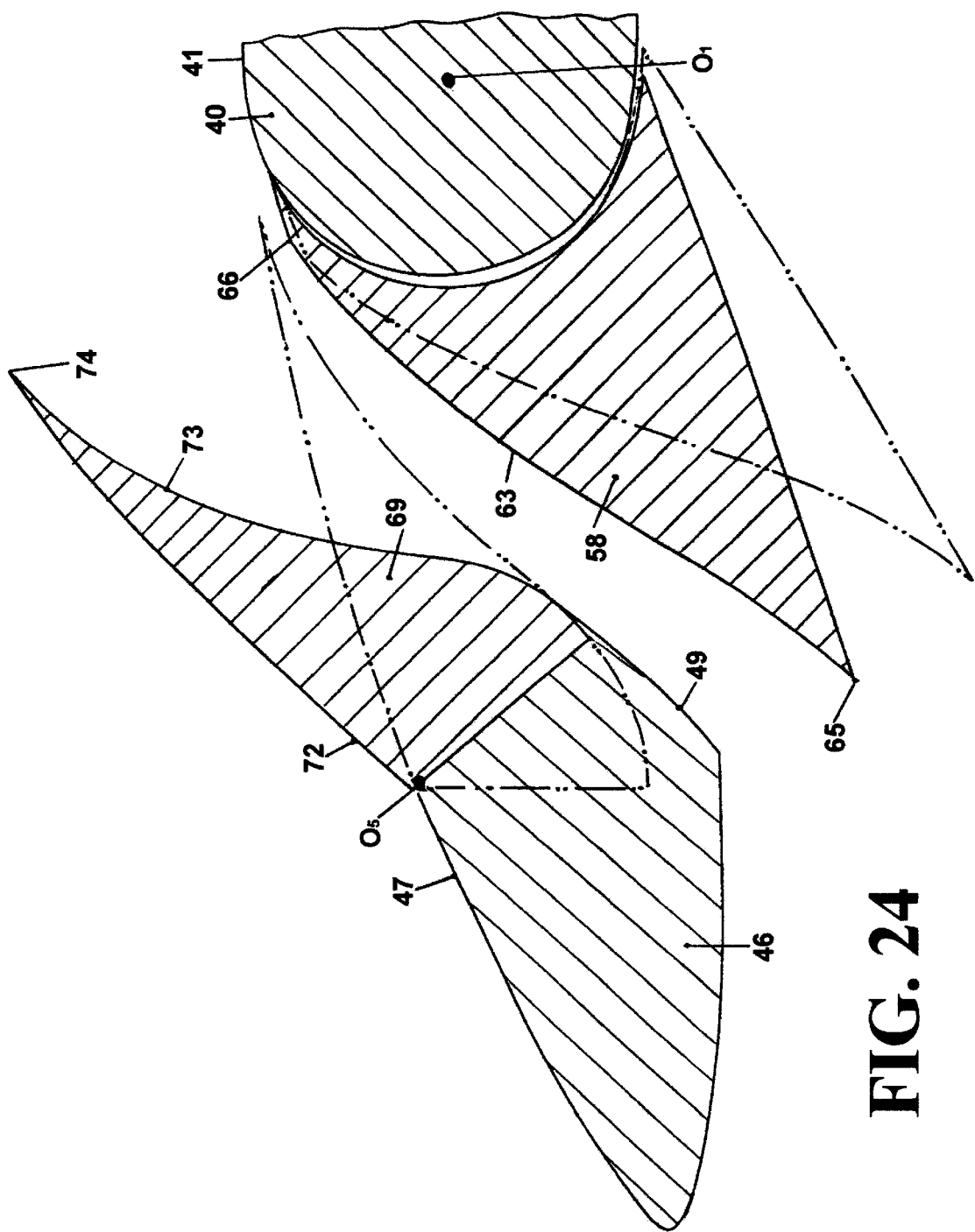
FIG. 24 shows a longitudinal cross section view of the aircraft wing with the simultaneous rotation of the slot forming segment in front of main portion and the slot changing spoiler in front of main portion relatively to the pivotal front portion.

In FIG. 24, it is shown the simultaneous rotation of slot forming segment 58 around axis of rotation $O_1$ and slot changing spoiler 69 around axis of rotation $O_5$ in the opposite direction relatively to pivotal front portion 46 thereby changing the camber of the upper surface of the aircraft wing and the size of the slot's inlet, accelerating the change in the convergence ratio of the convergent slot formed between slot forming segment 58 on one side and pivotal front portion 46 and slot changing spoiler 69 on the other side, as well as changing the camber of the aerodynamic embodiment formed by slot forming segment 58 and main portion 40.

Figure 25:
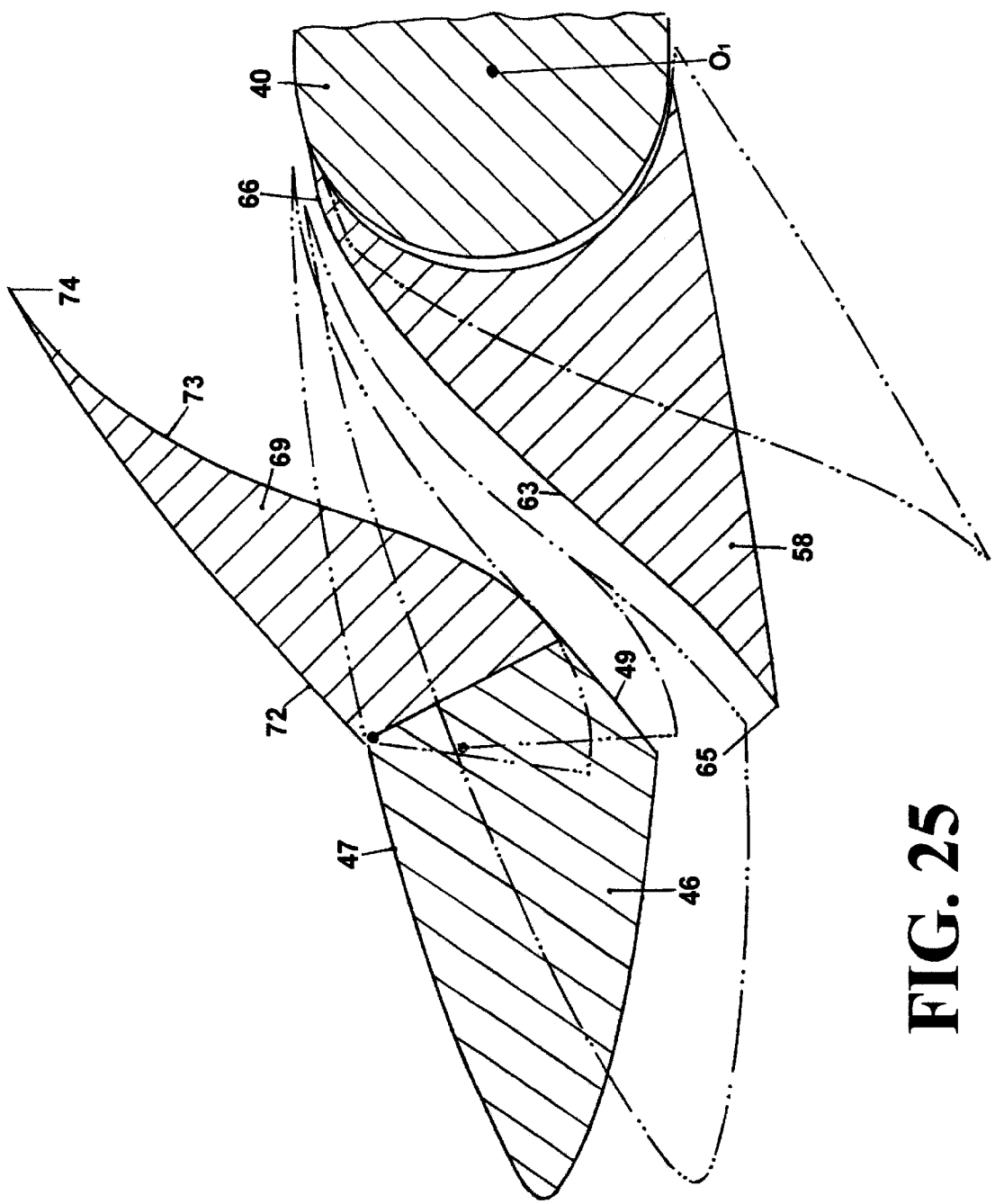
FIG. 25 shows a longitudinal cross section view of the aircraft wing with the rotation of the pivotal front portion relatively to the main portion, as well as the simultaneous rotation of the slot forming segment in front of main portion and the slot changing spoiler in front of the main portion relatively to the front portion.

In FIG. 25, it is shown the simultaneous rotation of pivotal front portion 46 around axis of rotation $O_1$ relatively to main portion 40 and the rotation of slot forming segment 58 around axis of rotation $O_1$ relatively to pivotal front portion 46 in the same direction, as well as the rotation of slot changing spoiler 69 around axis of rotation $O_5$ in the opposite direction. Consequently, in addition to the change in the camber of the upper surface of the aircraft wing, the size of slot's inlet, and the accelerated change in the convergent ratio of the convergent slot formed between slot forming segment 58 on one side and pivotal front portion 46 and slot changing spoiler 69 on the other side, as well as the change in camber of the aerodynamic embodiment formed by slot forming segment 58 and main portion 40 as described for FIG. 24, by means of the rotation shown in the FIG. 25, it is changed the camber of the aircraft wing airfoil and further more accelerated the change in camber of the aerodynamic embodiment formed by slot forming segment 58 and main portion 40.

Figure 26:
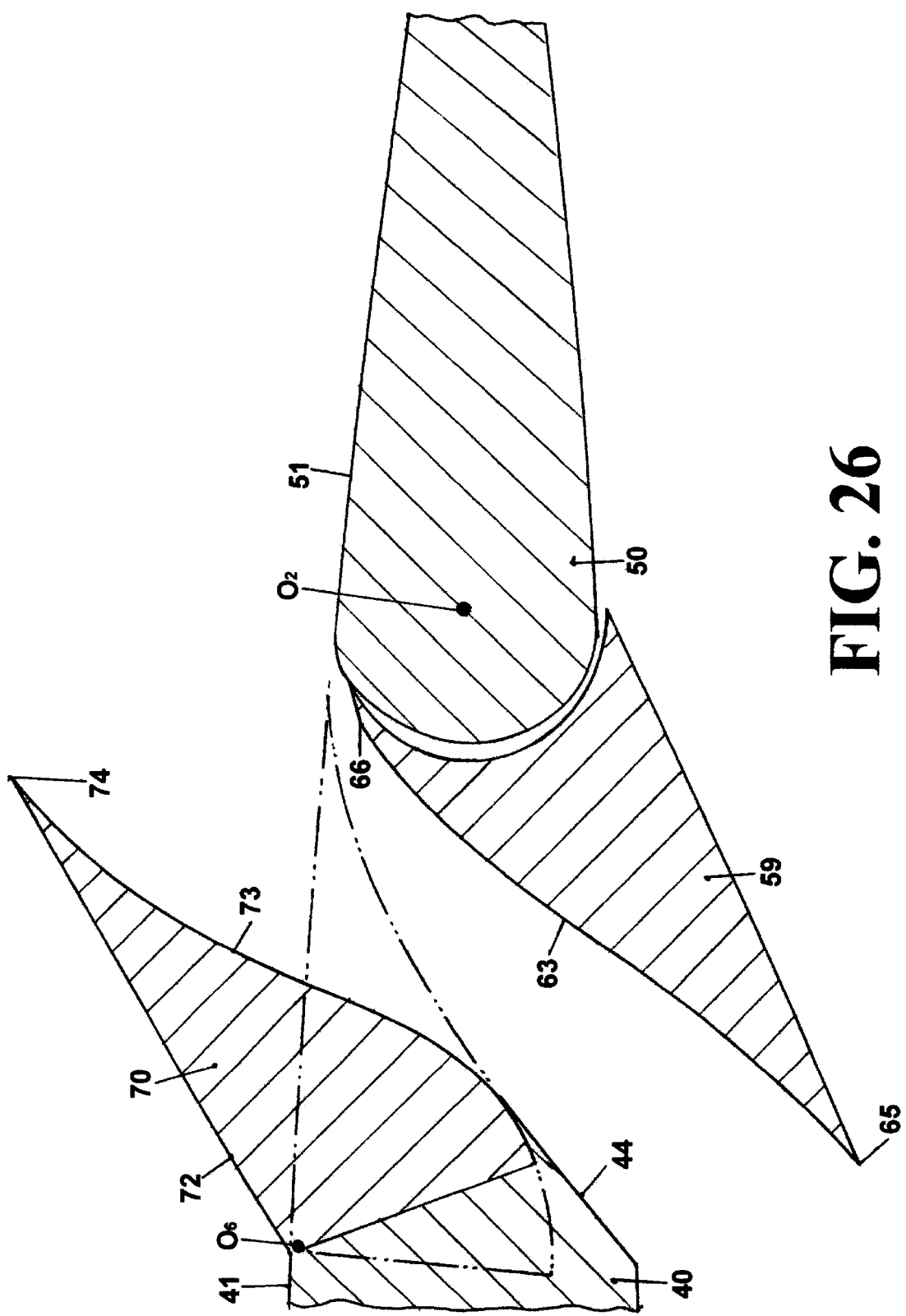
FIG. 26 shows a longitudinal cross section view of the aircraft wing with a rotation of the slot changing spoiler in front of pivotal rear portion relatively to the main portion and the change in the convergence of the convergent slot.

In FIG. 26, it is shown the rotation of slot changing spoiler 70 around axis of rotation $O_6$ upwards in the situation when slot forming segment 59 is deflected downwardly relatively to main portion 40 and a convergent slot is formed between slot forming segment 59 on one side and main portion 40 and slot changing spoiler 70 on the other side. In this case, similar effects are produced as in the situation described for FIG. 23, however in the area of pivotal rear portion 50.

Figure 27:
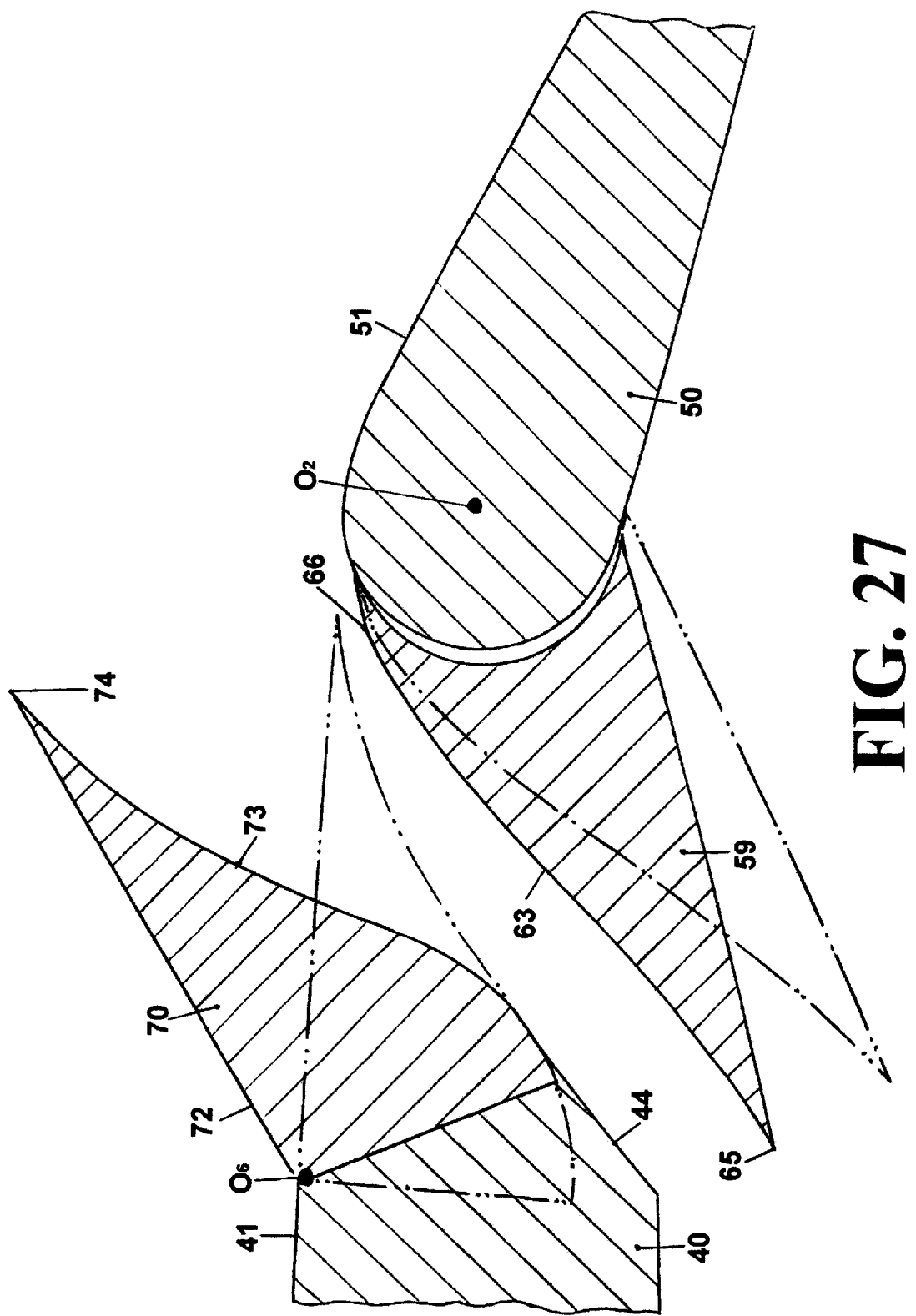
FIG. 27 shows a longitudinal cross section view of the aircraft wing with the simultaneous rotation of the slot forming segment in front of pivotal rear portion and the slot changing spoiler in front of pivotal rear portion relatively to the main portion.

In FIG. 27, it is shown the simultaneous rotation of slot forming segment 59 around axis of rotation $O_2$ and slot changing spoiler 70 around axis of rotation $O_6$ in the opposite direction relatively to main portion 40 thereby producing similar effects as in the situation described for FIG. 24, however, in the area of the pivotal rear portion 50.

Figure 28:
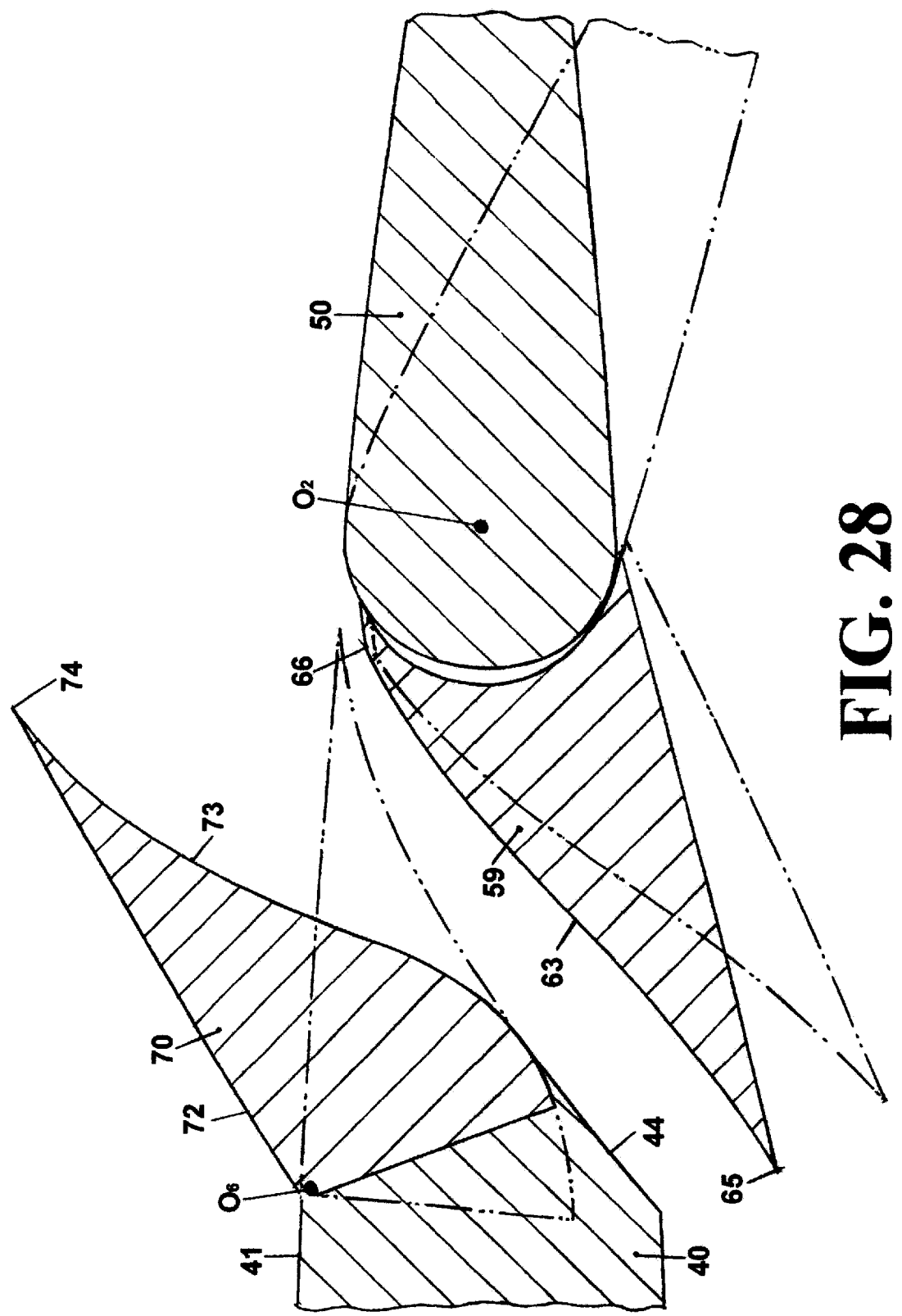
FIG. 28 shows a longitudinal cross section view of the aircraft wing with the rotation of the pivotal rear portion relatively to the main portion, as well as the simultaneous rotation of the slot forming segment in front of pivotal rear portion and the slot changing spoiler in front of pivotal rear portion relatively to the main portion.

In FIG. 28, it is shown the simultaneous rotation of pivotal rear portion 50 around axis of rotation $O_2$ and slot changing spoiler 70 around axis of rotation $O_6$ both relatively to main portion 40 in the same direction, as well as the rotation of slot forming segment 59 around axis of rotation $O_2$ relatively to main portion 40 in the opposite direction. In this situation, the similar effects are produced as in the situation described for FIG. 25, however, in the area of pivotal rear portion 50.

Figure 29:
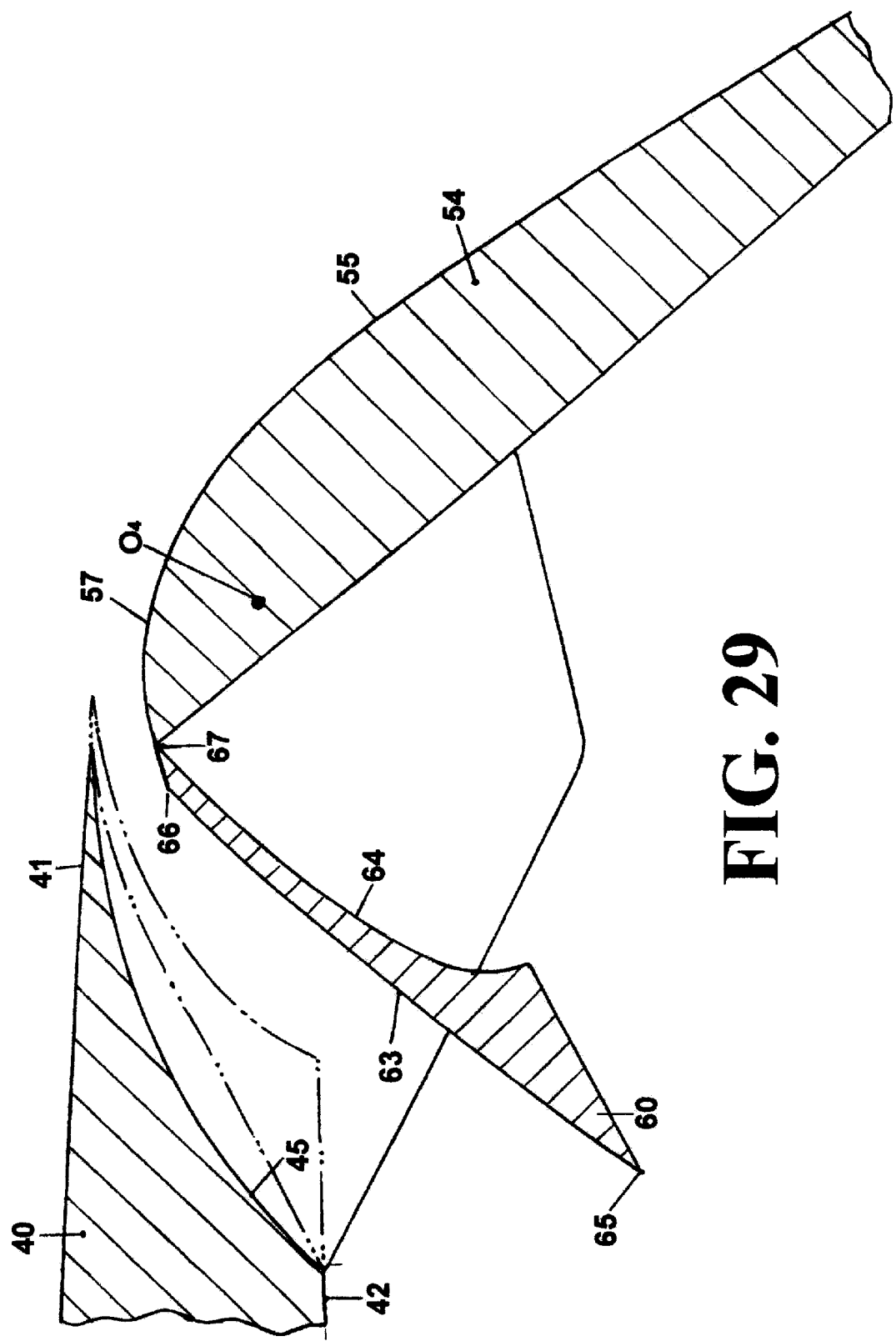
FIG. 29 shows a longitudinal cross section view of the aircraft wing with a rotation of the slot forming segment in front of movable rear portion relatively to the main portion when the movable rear portion is deflected relatively to the main portion.

In FIG. 29, it is shown the rotation of slot forming segment 60 around axis of rotation $O_4$ relatively to main portion 40 downwardly from its stowed position where slot forming segment 60 joined movable rear portion 54, which is deflected for needs of high lift production. By detaching slot forming segment 60 from main portion 40 and joining movable rear portion 54, slot forming segment 60 and main portion 40 form a high flux and convergence ratio slot, and slot forming segment 60 together with movable rear portion 54 form a new aerodynamic embodiment with significantly increased camber and surface area compared to the camber and surface area of movable rear portion 54.

Figure 30:
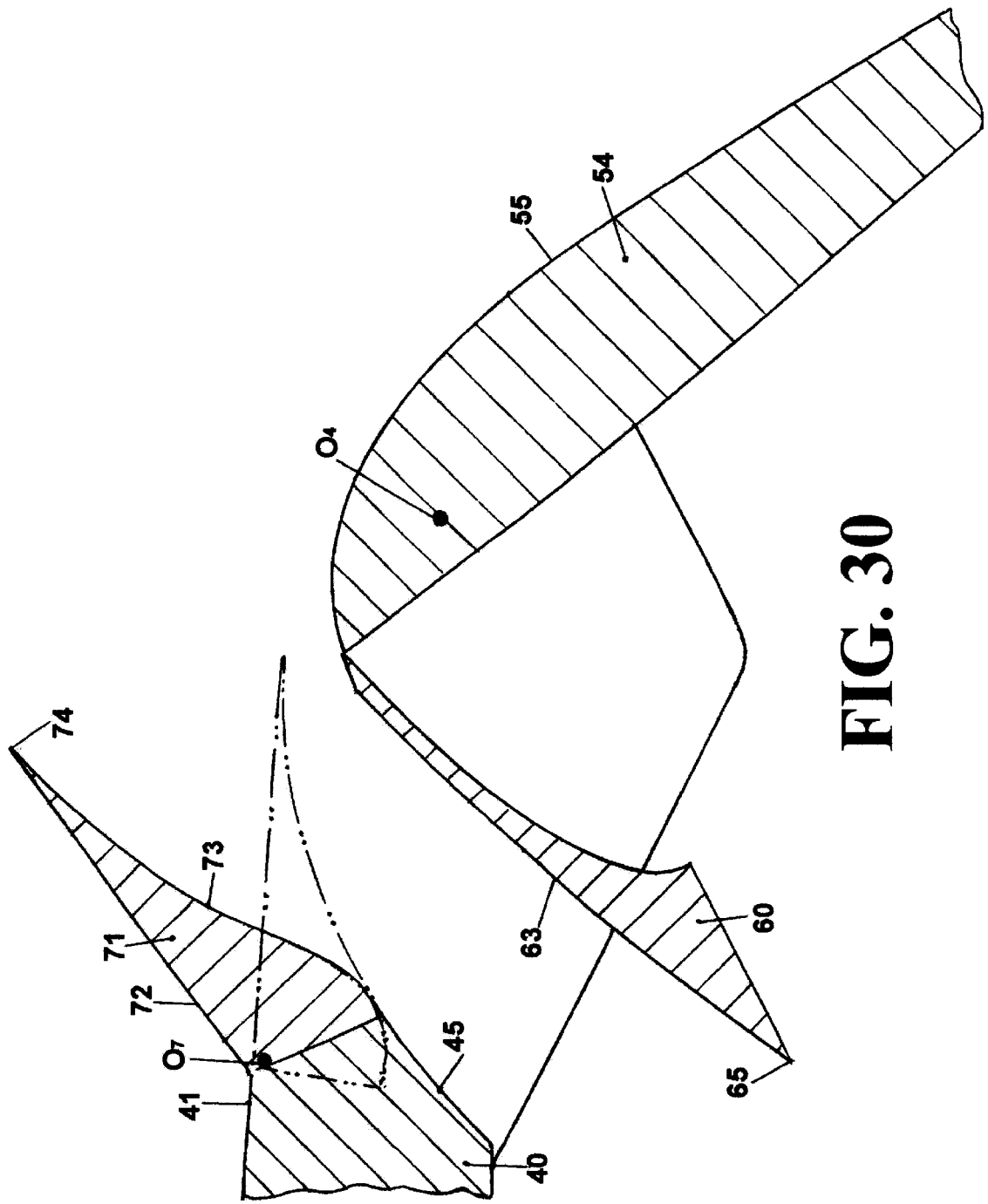
FIG. 30 shows a longitudinal cross section view of the aircraft wing with a rotation of a slot changing spoiler in front of movable rear portion relatively to the main portion when the slot forming segment in front of movable rear portion is deflected relatively to the main portion.

In FIG. 30, it is shown the rotation of slot changing spoiler 71 around axis of rotation $O_7$ upwards in the situation when slot forming segment 60 is detached from main portion 40 and the convergent slot is formed between slot forming segment 60 on one side and main portion 40 and slot changing spoiler 71 on the other side. In this case, similar effects are produced as in the situation described for FIG. 23, however, in the area of movable rear portion 54.

Figure 31:
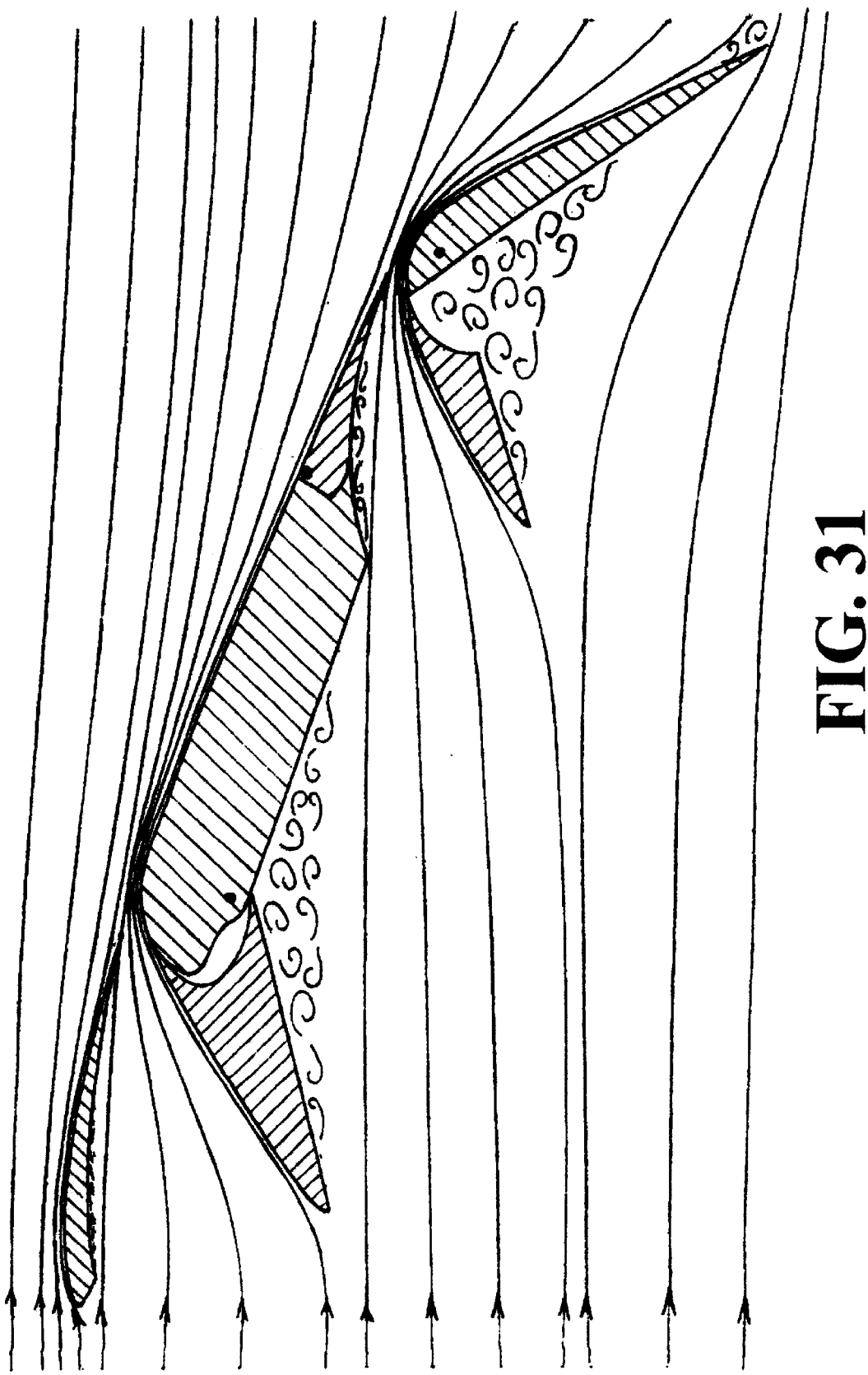
FIG. 31 shows a longitudinal cross section view of the aircraft wing in the area of the movable rear portion with airflow spectrum when parts of wing are deployed for extra lift production.

In FIG. 31, it is shown a spectrum of airflow in the area of movable rear portion 54 when main portion 40 is set under high attack angle; pivotal front portion 46 is set under the optimal attack angle for the production of the maximum lift on pivotal front portion 46; slot forming segment 58 is deflected downwardly relatively to both pivotal front portion 46 and main portion 40 for an angle that provides both high camber of the embodiment, which is formed by slot forming segment 58 and main portion 40, and the convergent slot between slot forming segment 58 and pivotal front portion 46 with enough air flux and convergence ratio to control the boundary layer over main portion upper surface 41; movable rear portion 54 is deflected from main portion 40 for an angle that provides maximum lift on the aerodynamic embodiment formed by movable rear portion 54 and slot forming segment 60 that is detached from main portion 40 and joined movable rear portion 54 thereby forming the convergent slot between main portion 40 and slot forming segment 60 for the control of the boundary layer over movable rear portion upper surface 55. With this configuration of the aircraft wing, it is multiply increased the lift of the aircraft wing as compared to the effects produced with application of prior art, which is obvious from the airflow spectrum.

The aircraft wing that is using slot forming segments and slot changing spoilers is functioning as follows:

a) at higher speeds of flight, all slot forming segments are stowed into the coves of the portions of the wing that are disposed immediately in front of the slot forming segments and all slot changing spoilers adhere on the slot forming segments which they border in order to minimize drag on the aircraft wing. Pivotal front portion 46 together with slot forming segment 58, which is stowed into pivotal front portion 46, and with slot changing spoiler 69, which adheres onto slot forming segment 58, can rotate relatively to main portion 40 in order to obtain optimal lift and drag; pivotal rear portion 50 can rotate relatively to main portion 40 for the need of roll control; all slot changing spoilers can rotate for needs of yaw and roll maneuver.

b) during the take-off of the aircraft, all slot forming segments are stowed into the portions of wing that are disposed immediately in front of the slot forming segments and all slot changing spoilers adhere on the slot forming segments which they border in order to minimize drag on the aircraft wing; pivotal front portion 46 together with slot forming segment 58 and slot changing spoiler 69 as a unique embodiment, pivotal rear portion 50, and movable rear portion 54 are deflected relatively to main portion 40 for angles that provide the optimum of lift versus drag ratio.

c) during the landing phase and at stall speed of the aircraft, the parts of the aircraft wing are deployed in the following manner: main portion 40 is set under a high attack angle in order to initiate as high air acceleration as possible over the upper surface of the wing; all slot changing spoilers are in their lowest position relatively to the portion of the wing for which they are connected; pivotal front portion 46 is set under the optimal attack angle in order to produce its maximum lift; slot forming segment 58 is deflected relatively to pivotal front portion 46 for an angle that gives both the optimal camber of the aerodynamic embodiment, which is formed by main portion 40 and slot forming segment 58, and the flux and convergence ratio of the convergent slot between pivotal front portion 46 and slot forming segment 58 high enough to control the boundary layer over main portion upper surface 41 in order to produce maximum lift possible on slot forming segment 58 and main portion 40; pivotal rear portion 50 on both wings is deflected downwardly relatively to main portion 40 for an angle that allows additionally sufficient deflection of pivotal rear portion 50 downwardly for roll maneuver; slot forming segment 59 is also deflected downwardly relatively to main portion 40 for an angle that gives both the optimal camber of the aerodynamic embodiment, which is formed by slot forming segment 59 and pivotal rear portion 50, and the flux and convergence ratio of the convergent slot between slot forming segment 59 and main portion 40 high enough to control the boundary layer over pivotal rear portion upper surface 51; movable rear portion 54 on both wings is deflected downwardly for the optimal angle that provides for maximum lift production in the area of movable rear portion 54; slot forming segment 60 is detached from main portion 40 and joined movable rear portion 54 thereby forming the aerodynamic embodiment with high camber and increased surface area, which is formed by slot forming segment 60 and movable rear portion 54, as well as the convergent slot between main portion 40 and slot forming segment 60 with air flux and convergence ratio high enough to control the boundary layer over movable rear portion upper surface 55. The formerly described configuration of the aircraft wing provides multiple increase in lift production thereby reducing the landing speed, length of runway, and increasing safety at landing compared to prior art.

d) for roll maneuver during the landing phase and at stall speed of the aircraft, pivotal rear portion 50 together with slot forming segment 59 and slot changing spoiler 70 are used. Pivotal rear portion 50 from already deflected position for extra lift production is additionally deflected downwardly relatively to main portion 40 on one wing increasing the camber and the attack angle of the entire wing in the area of pivotal rear portion 50 as well as the camber of the aerodynamic embodiment formed by slot forming segment 59 and pivotal rear portion 50 thereby increasing significantly the lift on that wing. Simultaneously, on the other wing, pivotal rear portion 50 from already downwardly deflected position for extra lift production is deflected upwardly relatively to main portion 40 with simultaneous deflection upwardly of slot forming segment 59 and slot changing spoiler 70 decreasing the camber of the entire wing, the camber of the upper surface of wing, the camber of the embodiment, which is formed by slot forming segment 59 and pivotal rear portion 50, as well as the air flux capacity and the convergence ratio of the convergent slot in front of slot forming segment 59 thereby significantly and quickly decreasing lift in the area of pivotal rear portion 50 on this wing. The significant increase in lift on one wing and significant decrease in lift on the other wing in the area of pivotal rear portion 50 and great distance between pivotal rear portion 50 and the gravity center of the aircraft produce a very efficient roll momentum for the roll maneuver and lateral stabilization of the aircraft.

With a programmable speed of the deflection of slot changing spoiler 70, it can be equalized the drag on the both sides of wing in the phase of the lateral stabilization during the landing phase and thereby prevent undesirable yaw momentum.

e) after the touch down of the aircraft during the landing phase, all slot changing spoilers on both wings can be deflected upwards for the maximum angles to be used as air brakes.

I claim:

1. A wing assembly for an aircraft having a longitudinal and a transverse axis comprising:

a) a number of coupled portions being adjacent along said longitudinal axis and pivotal relatively to each other, the pivotal adjacent portions comprise a leading and a following portion, the pivotal leading portion and the pivotal following portion having a common axis of their mutually relative rotation, the pivotal leading portion includes a number of coves formed at a carved trailing edge thereof, the pivotal leading portion in the area of coves thereof having an upper surface, an under surface, and a rear surface, the pivotal leading portion rear surface having a rear edge, the rear edge of the pivotal leading portion rear surface coincides with an intersection of the pivotal leading portion rear surface and the pivotal leading portion upper surface, the pivotal following portion having an upper surface, an under surface, and a front surface, the pivotal following portion front surface extending from the pivotal following portion upper surface to the pivotal following portion under surface, b) a number of slot forming segments being disposed between the adjacent portions, each slot forming segment being inserted into the cove of the leading portion, the slot forming segment having a common axis of mutually relative rotation with both the leading and the following pivotal portion, the slot forming segment having an upper surface, an under surface, a front surface, and a rear surface, the slot forming segment front surface having a front and a rear edge, the front edge of the slot forming segment front surface coincides with an intersection of the slot forming segment front surface and the slot forming segment under surface, the rear edge of the slot forming segment front surface coincides with an intersection of the slot forming segment front surface and the slot forming segment upper surface, the slot forming segment rear surface extending from the slot forming segment upper surface to the slot forming segment under surface.

2. A wing assembly as claimed in claim 1, wherein the slot forming segment being stowed into the cove of the leading portion and said wing assembly being arranged for cruising speed configurations, the slot forming segment upper surface and the slot forming segment under surface having curvatures, the curvature of the slot forming segment upper surface constitutes a portion of a smooth continuous curvature of an upper surface of said wing assembly and the curvature of the slot forming segment under surface constitutes a portion of a smooth continuous curvature of an under surface of said wing assembly.

3. A wing assembly as claimed in claim 1, wherein the slot forming segment front surface extends from the slot forming segment under surface to the slot forming segment upper surface, the slot forming segment front surface having a smooth continuous curvature.

4. A wing assembly as claimed in claim 1, wherein the front edge of the slot forming segment front surface and the rear edge of the slot forming segment front surface are disposed in front of the axis of rotation of the slot forming segment, and a distance between the front edge of the slot forming segment front surface and the axis of rotation of the slot forming segment is multiply longer than a distance between the rear edge of the slot forming segment front surface and the axis of rotation of the slot forming segment.

5. A wing assembly as claimed in claim 1, wherein the slot forming segment being disposed directly in front of the pivotal following portion, the pivotal following portion front surface and the slot forming segment rear surface having shapes and distances from the axis of rotation of the slot forming segment, said shapes and said distances permit an unobstructed rotation of the slot forming segment around the axis of rotation thereof relatively to the pivotal following portion and simultaneously, said shapes and said distances enable closing of a gap between the slot forming segment and the pivotal following portion.

6. A wing assembly as claimed in claim 1, wherein the slot forming segment being stowed into the cove of the leading portion, the front edge of the slot forming segment front surface adheres on the leading portion and simultaneously, the rear edge of the leading portion rear surface adheres on the slot forming segment.

7. A wing assembly as claimed in claim 6, wherein the slot forming segment being stowed into the cove of the leading portion, the slot forming segment is deflected downwardly from its stowed position relatively to the leading portion whereby detaching the front edge of the slot forming segment front surface from the leading portion, as well as the rear edge of the leading portion rear surface from the slot forming segment and forming a slot being convergent in the direction of airflow between the slot forming segment and the leading portion.

8. A wing assembly as claimed in claim 1, wherein the slot forming segment being stowed into the cove of the pivotal leading portion, the slot forming segment is pivoted downwardly from the stowed position thereof relatively to both the pivotal leading portion and the pivotal following portion around the axis of rotation of the slot forming segment whereby increasing a camber and an aerodynamic surface of the pivotal following portion.

9. A wing assembly for an aircraft having a longitudinal and a transverse axis comprising:

a) a number of coupled portions being adjacent along said longitudinal axis and pivotal relatively to each other, the pivotal adjacent portions comprise a leading and a following portion, the pivotal leading portion and the pivotal following portion having a common axis of their mutually relative rotation, the pivotal leading portion includes a number of coves formed at a carved trailing edge thereof, the pivotal leading portion in the area of coves thereof having an upper surface, an under surface, and a rear surface, the pivotal leading portion rear surface having a rear edge, the rear edge of the pivotal leading portion rear surface coincides with an intersection of the pivotal leading portion rear surface and the pivotal leading portion upper surface, the pivotal following portion having an upper surface, an under surface, and a front surface, the pivotal following portion front surface extending from the pivotal following portion upper surface to the pivotal following portion under surface, b) a number of slot forming segments being disposed between the adjacent portions, each slot forming segment being inserted into the cove of the leading portion, the slot forming segment having a common axis of mutually relative rotation with both the leading and the following pivotal portion, the slot forming segment having an upper surface, an under surface, a front surface, and a rear surface, the slot forming segment front surface having a front and a rear edge, the front edge of the slot forming segment front surface coincides with an intersection of the slot forming segment front surface and the slot forming segment under surface, the rear edge of the slot forming segment front surface coincides with an intersection of the slot forming segment front surface and the slot forming segment upper surface, the slot forming segment rear surface extending from the slot forming segment upper surface to the slot forming segment under surface.

c) a number of slot changing spoilers being disposed directly in front of the slot forming segments, each slot changing spoiler being pivotally connected to the leading portion and having an axis of rotation, an upper surface, and an under surface, the slot changing spoiler upper surface having a curvature, the curvature of the slot changing spoiler upper surface with a curvature of the leading portion upper surface constitutes a smooth continuous curvature when the slot changing spoiler is in a cruising speed position, the slot changing spoiler under surface having a front and a rear edge, the rear edge of the slot changing spoiler under surface coincides with an intersection of the slot changing spoiler upper surface and the slot changing spoiler under surface.

10. A wing assembly as claimed in claim 9, wherein the slot forming segment being stowed into the cove of the leading portion and said wing assembly being arranged for cruising speed configurations, the slot forming segment upper surface and the slot forming segment under surface having curvatures, the curvature of the slot forming segment upper surface constitutes a portion of a smooth continuous curvature of an upper surface of said wing assembly and the curvature of the slot forming segment under surface constitutes a portion of a smooth continuous curvature of an under surface of said wing assembly.

11. A wing assembly as claimed in claim 9, wherein the slot forming segment front surface extends from the slot forming segment under surface to the slot forming segment upper surface, the slot forming segment front surface having a smooth continuous curvature.

12. A wing assembly as claimed in claim 9, wherein the front edge of the slot forming segment front surface and the rear edge of the slot forming segment front surface are disposed in front of the axis of rotation of the slot forming segment, and a distance between the front edge of the slot forming segment front surface and the axis of rotation of the slot forming segment is multiply longer than a distance between the rear edge of the slot forming segment front surface and the axis of rotation of the slot forming segment.

13. A wing assembly as claimed in claim 9, wherein the slot forming segment being disposed directly in front of the pivotal following portion, the pivotal following portion front surface and the slot forming segment rear surface having shapes and distances from the axis of rotation of the slot forming segment, said shapes and said distances permit an unobstructed rotation of the slot forming segment around the axis of rotation thereof relatively to the pivotal following portion and simultaneously, said shapes and said distances enable closing of a gap between the slot forming segment and the pivotal following portion.

14. A wing assembly as claimed in claim 9, wherein the slot changing spoiler having its axis of rotation, the slot changing spoiler under surface having a continuous curvature extending from the front edge of the slot changing spoiler under surface to the rear edge of the slot changing spoiler under surface, the leading portion rear surface having a continuous curvature extending from the leading portion under surface to the slot changing spoiler under surface.

15. A wing assembly as claimed in claim 14, wherein the leading portion rear surface and a portion of the slot changing spoiler under surface, which extends from a connecting line between the leading portion rear surface and the slot changing spoiler under surface to the rear edge of the slot changing spoiler under surface, constitute a continuous curvature, and the rest of the slot changing spoiler undersurface, which extends from said connecting line to the front edge of the slot changing spoiler under surface, is shaped as a cylindrical curvature whose axis coincides with the axis of rotation of the slot changing spoiler.

16. A wing assembly as claimed in claim 9, wherein the slot forming segment being stowed into the cove of the leading portion, the slot changing spoiler having its axis of rotation and being in the cruising speed position, the front edge of the slot forming segment front surface adheres on the leading portion and the rear edge of the slot changing spoiler under surface adheres on the slot forming segment.

17. A wing assembly as claimed in claim 16, wherein the slot forming segment being stowed into the cove of the leading portion, the slot changing spoiler having its axis of rotation and being in the cruising speed position, the slot forming segment is deflected downwardly relatively to both the leading portion and the slot changing spoiler whereby detaching the front edge of the slot forming segment front surface from the leading portion, as well as the rear edge of the slot changing spoiler under surface from the slot forming segment and forming a slot being convergent in the direction of airflow, said slot is bordered with the slot forming segment front surface from the rear side and with both the leading portion rear surface and the slot changing spoiler under surface from the front side.

18. A wing assembly as claimed in claim 17, wherein said slot being formed, the slot changing spoiler is pivoted around the axis of rotation thereof whereby changing a convergent ratio of said slot.

19. A wing assembly as claimed in claim 9, wherein the slot forming segment being stowed into the cove of the pivotal leading portion, the slot forming segment is pivoted downwardly from the stowed position thereof relatively to both the pivotal leading portion and the pivotal following portion around the axis of rotation of the slot forming segment whereby increasing a camber and an aerodynamic surface of the pivotal following portion.

* * * * *